US009640032B2

(12) United States Patent
Arnone et al.

(10) Patent No.: US 9,640,032 B2
(45) **Date of Patent: *May 2, 2017**

(54) ELECTROMECHANICAL HYBRID GAMING SYSTEM

(71) Applicant: Gamblit Gaming, LLC, Glendale, CA (US)

(72) Inventors: Miles Arnone, Sherborn, MA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/601,108

(22) Filed: Jan. 20, 2015

(65) Prior Publication Data

US 2015/0141128 A1 May 21, 2015

Related U.S. Application Data

(63) Continuation of application No. 14/339,142, filed on Jul. 23, 2014, now Pat. No. 8,944,899, which is a (Continued)

(51) Int. Cl.
*G06F 17/00* (2006.01)
*G06F 19/00* (2011.01)
(Continued)

(52) U.S. Cl.
CPC ........ *G07F 17/3244* (2013.01); *A63F 7/0672* (2013.01); *G07F 17/3225* (2013.01); *G07F 17/3262* (2013.01); *G07F 17/38* (2013.01)

(58) Field of Classification Search
CPC .. G07F 17/3244; G07F 17/3225; G07F 17/38; G07F 17/3262; A63F 7/0672
See application file for complete search history.

(56) References Cited

U.S. PATENT DOCUMENTS 1,374,844 A 4/1921 Flatow
4,968,035 A 11/1990 Furlong
(Continued)

FOREIGN PATENT DOCUMENTS

FR 2939940 A1 6/2010
JP H6-254256 A 9/1994
(Continued)

OTHER PUBLICATIONS

Supplemental European Patent Office Search Report and Written Opinion dated Apr. 13, 2015.
(Continued)

*Primary Examiner* — Milap Shah
(74) *Attorney, Agent, or Firm* — Frank Cire

(57) ABSTRACT

Systems in accordance with embodiments of the invention operate an electromechanical hybrid gaming system including a real world engine configured to provide a randomly generated payout for a gambling game; an electromechanical game system connected to an entertainment game user interface and constructed to manage the electromechanical table game including an actuator that affects a goal of the electromechanical table game, wherein outcomes of the electromechanical table game are based upon actions performed by the player, wherein the electromechanical game system operates the actuator based on an outcome of the randomly generated payout for the gambling game; and a game world engine connected to the electromechanical game system and the real world engine, the game world engine constructed to communicate gameplay gambling event occurrences based upon the sensed actions by the player during the player's skillful execution of the electromechanical table game.

30 Claims, 6 Drawing Sheets

Related U.S. Application Data continuation of application No. 13/917,513, filed on Jun. 13, 2013, now Pat. No. 8,790,170, which is a continuation of application No. PCT/US2012/058156, filed on Sep. 29, 2012.

(60) Provisional application No. 61/626,653, filed on Sep. 30, 2011.

(51) Int. Cl.

| | |
|---|---|
| ***A63F 13/00*** | (2014.01) |
| ***A63F 9/24*** | (2006.01) |
| ***G07F 17/32*** | (2006.01) |
| ***A63F 7/06*** | (2006.01) |
| ***G07F 17/38*** | (2006.01) |

(56) References Cited

U.S. PATENT DOCUMENTS 5,413,357 A 5/1995 Schulze et al.
5,718,429 A * 2/1998 Keller, Jr. ........... A63F 3/00157 273/274
5,785,592 A 7/1998 Jacobsen
5,853,324 A 12/1998 Kami et al.
5,963,745 A 10/1999 Collins et al.
6,050,895 A 4/2000 Luciano
6,165,071 A 12/2000 Weiss
6,227,974 B1 5/2001 Eilat
6,234,476 B1 * 5/2001 Yamashita ............ A63F 7/3603 273/126 A
6,267,669 B1 * 7/2001 Luciano, Jr. ............ A63F 13/10 273/269
6,276,682 B1 * 8/2001 Yamashita ............ A63F 7/3603 273/126 A
6,491,296 B2 * 12/2002 Kelly .................... A63F 7/0058 273/108
6,685,563 B1 2/2004 Meekins et al.
6,712,693 B1 3/2004 Hettinger
6,761,632 B2 7/2004 Bansemer et al.
6,761,633 B2 7/2004 Riendeau
6,764,397 B1 7/2004 Robb
6,811,482 B2 11/2004 Letovsky
7,118,105 B2 10/2006 Benevento
7,284,756 B2 10/2007 Pierce et al.
7,294,058 B1 11/2007 Slomiany
7,326,115 B2 * 2/2008 Baerlocher ............. G07F 17/32 463/1
7,361,091 B2 4/2008 Letovsky
7,517,282 B1 4/2009 Pryor
7,575,517 B2 8/2009 Parham et al.
7,682,239 B2 3/2010 Friedman et al.
7,720,733 B2 5/2010 Jung
7,753,770 B2 7/2010 Walker et al.
7,753,790 B2 7/2010 Nguyen
7,766,742 B2 8/2010 Bennett et al.
7,775,885 B2 8/2010 Van Luchene
7,789,390 B2 * 9/2010 Giegerich ................. A63F 7/06 273/108
7,798,896 B2 9/2010 Katz
7,828,657 B2 11/2010 Booth
7,917,371 B2 3/2011 Jung et al.
7,938,727 B1 5/2011 Konkle
7,967,674 B2 6/2011 Baerlocher
7,980,948 B2 7/2011 Rowe
7,996,264 B2 8/2011 Kusumoto et al.
8,012,023 B2 9/2011 Gates
8,047,908 B2 11/2011 Walker
8,047,915 B2 11/2011 Lyle
8,060,829 B2 11/2011 Jung et al.
8,075,383 B2 12/2011 Friedman et al.
8,087,999 B2 1/2012 Oberberger
8,113,938 B2 2/2012 Friedman et al.
8,118,654 B1 2/2012 Nicolas
8,128,487 B2 3/2012 Hamilton et al.
8,135,648 B2 3/2012 Oram
8,137,193 B1 3/2012 Kelly et al.
8,142,272 B2 3/2012 Walker
8,157,653 B2 4/2012 Buhr
8,167,699 B2 5/2012 Inamura
8,177,628 B2 5/2012 Manning
8,182,338 B2 5/2012 Thomas
8,182,339 B2 5/2012 Anderson
8,187,068 B2 5/2012 Slomiany
8,192,261 B2 * 6/2012 Yang .................. A63B 24/0021 273/401
8,206,210 B2 6/2012 Walker
8,308,544 B2 11/2012 Friedman
8,475,266 B2 7/2013 Arnone
8,480,470 B2 7/2013 Napolitano et al.
8,602,881 B2 * 12/2013 Arnone .................. G06Q 50/34 463/16
8,622,809 B1 1/2014 Arora et al.
8,657,660 B2 * 2/2014 Arnone ..................... A63F 9/24 463/16
8,790,170 B2 * 7/2014 Arnone ................ A63F 7/0672 273/108
8,944,899 B2 * 2/2015 Arnone ................ A63F 7/0672 273/108
9,339,722 B2 * 5/2016 Toshima ............... A63F 7/0636
2001/0004609 A1 6/2001 Walker et al.
2001/0009316 A1 * 7/2001 Krise ...................... A63F 7/022 273/108
2001/0019965 A1 9/2001 Ochi
2002/0022509 A1 2/2002 Nicastro
2002/0090990 A1 7/2002 Joshi et al.
2002/0175471 A1 11/2002 Faith
2003/0060286 A1 3/2003 Walker et al.
2003/0119576 A1 6/2003 McClintic et al.
2003/0139214 A1 7/2003 Wolf et al.
2003/0171149 A1 9/2003 Rothschild
2003/0204565 A1 10/2003 Guo et al.
2003/0211879 A1 11/2003 Englman
2004/0092313 A1 5/2004 Saito et al.
2004/0102238 A1 5/2004 Taylor
2004/0121839 A1 6/2004 Webb
2004/0225387 A1 11/2004 Smith
2005/0003878 A1 1/2005 Updike
2005/0096124 A1 5/2005 Stronach
2005/0116411 A1 6/2005 Herrmann et al.
2005/0127601 A1 6/2005 Giegerich et al.
2005/0161878 A1 7/2005 Nally et al.
2005/0192087 A1 9/2005 Friedman et al.
2005/0233791 A1 10/2005 Kane
2005/0233806 A1 10/2005 Kane et al.
2005/0239538 A1 10/2005 Dixon
2005/0269778 A1 12/2005 Samberg
2005/0288101 A1 12/2005 Lockton et al.
2006/0003823 A1 1/2006 Zhang
2006/0003830 A1 1/2006 Walker et al.
2006/0035696 A1 2/2006 Walker
2006/0040735 A1 2/2006 Baerlocher
2006/0068913 A1 3/2006 Walker et al.
2006/0084499 A1 4/2006 Moshal
2006/0084505 A1 4/2006 Yoseloff
2006/0135250 A1 6/2006 Rossides
2006/0154710 A1 7/2006 Serafat
2006/0166729 A1 7/2006 Saffari et al.
2006/0189371 A1 8/2006 Walker et al.
2006/0223611 A1 10/2006 Baerlocher
2006/0234791 A1 10/2006 Nguyen et al.
2006/0240890 A1 10/2006 Walker
2006/0246403 A1 11/2006 Monpouet et al.
2006/0258433 A1 11/2006 Finocchio et al.
2007/0026924 A1 2/2007 Taylor
2007/0035548 A1 2/2007 Jung et al.
2007/0038559 A1 2/2007 Jung et al.
2007/0064074 A1 3/2007 Silverbrook et al.
2007/0087799 A1 4/2007 Van Luchene
2007/0093299 A1 4/2007 Bergeron
2007/0099696 A1 5/2007 Nguyen et al.
2007/0117641 A1 5/2007 Walker et al.
2007/0129149 A1 6/2007 Walker
2007/0156509 A1 7/2007 Jung et al.

(56) References Cited

U.S. PATENT DOCUMENTS

| | | | | |
|---|---|---|---|---|
| 2007/0167212 | A1 | 7/2007 | Nguyen | |
| 2007/0167239 | A1 | 7/2007 | O'Rourke | |
| 2007/0173311 | A1 | 7/2007 | Morrow et al. | |
| 2007/0191104 | A1 | 8/2007 | Van Luchene | |
| 2007/0203828 | A1 | 8/2007 | Jung et al. | |
| 2007/0207847 | A1 | 9/2007 | Thomas | |
| 2007/0259717 | A1 | 11/2007 | Mattice | |
| 2007/0293306 | A1 | 12/2007 | Nee et al. | |
| 2008/0004107 | A1 | 1/2008 | Nguyen et al. | |
| 2008/0014835 | A1 | 1/2008 | Weston et al. | |
| 2008/0015004 | A1 | 1/2008 | Gatto et al. | |
| 2008/0064488 | A1 | 3/2008 | Oh | |
| 2008/0070659 | A1 | 3/2008 | Naicker | |
| 2008/0070690 | A1 | 3/2008 | Van Luchene | |
| 2008/0070702 | A1 | 3/2008 | Kaminkow | |
| 2008/0096665 | A1 | 4/2008 | Cohen | |
| 2008/0108406 | A1 | 5/2008 | Oberberger | |
| 2008/0108425 | A1* | 5/2008 | Oberberger ............. | G07F 17/32 463/25 |
| 2008/0113704 | A1 | 5/2008 | Jackson | |
| 2008/0119283 | A1 | 5/2008 | Baerlocher | |
| 2008/0146308 | A1 | 6/2008 | Okada | |
| 2008/0161081 | A1 | 7/2008 | Berman | |
| 2008/0176619 | A1 | 7/2008 | Kelly | |
| 2008/0191418 | A1 | 8/2008 | Lutnick et al. | |
| 2008/0195481 | A1 | 8/2008 | Lutnick | |
| 2008/0248850 | A1 | 10/2008 | Schugar | |
| 2008/0254893 | A1 | 10/2008 | Patel | |
| 2008/0274796 | A1 | 11/2008 | Lube | |
| 2008/0274798 | A1 | 11/2008 | Walker et al. | |
| 2008/0311980 | A1 | 12/2008 | Cannon | |
| 2008/0318668 | A1 | 12/2008 | Ching | |
| 2009/0011827 | A1 | 1/2009 | Englman | |
| 2009/0023489 | A1 | 1/2009 | Toneguzzo | |
| 2009/0023492 | A1 | 1/2009 | Erfanian | |
| 2009/0061974 | A1 | 3/2009 | Lutnick et al. | |
| 2009/0061975 | A1 | 3/2009 | Ditchev | |
| 2009/0061991 | A1 | 3/2009 | Popovich | |
| 2009/0061997 | A1 | 3/2009 | Popovich | |
| 2009/0061998 | A1 | 3/2009 | Popovich | |
| 2009/0061999 | A1 | 3/2009 | Popovich | |
| 2009/0082093 | A1 | 3/2009 | Okada | |
| 2009/0088239 | A1 | 4/2009 | Iddings | |
| 2009/0098934 | A1 | 4/2009 | Amour | |
| 2009/0118006 | A1 | 5/2009 | Kelly et al. | |
| 2009/0124344 | A1 | 5/2009 | Mitchell et al. | |
| 2009/0131158 | A1 | 5/2009 | Brunet De Courssou et al. | |
| 2009/0131175 | A1 | 5/2009 | Kelly et al. | |
| 2009/0143141 | A1 | 6/2009 | Wells | |
| 2009/0149233 | A1 | 6/2009 | Strause et al. | |
| 2009/0156297 | A1 | 6/2009 | Andersson et al. | |
| 2009/0176560 | A1 | 7/2009 | Herrmann et al. | |
| 2009/0176566 | A1 | 7/2009 | Kelly | |
| 2009/0181777 | A1 | 7/2009 | Christiani | |
| 2009/0221355 | A1 | 9/2009 | Dunaevsky et al. | |
| 2009/0239610 | A1 | 9/2009 | Olive | |
| 2009/0247272 | A1 | 10/2009 | Abe | |
| 2009/0270164 | A1 | 10/2009 | Seelig | |
| 2009/0275411 | A1 | 11/2009 | Kisenwether et al. | |
| 2009/0291755 | A1 | 11/2009 | Walker et al. | |
| 2009/0309305 | A1 | 12/2009 | May | |
| 2009/0312093 | A1 | 12/2009 | Walker et al. | |
| 2009/0325686 | A1 | 12/2009 | Davis | |
| 2010/0004058 | A1 | 1/2010 | Acres | |
| 2010/0016056 | A1 | 1/2010 | Thomas et al. | |
| 2010/0029373 | A1 | 2/2010 | Graham et al. | |
| 2010/0035674 | A1 | 2/2010 | Slomiany | |
| 2010/0056247 | A1 | 3/2010 | Nicely | |
| 2010/0056260 | A1 | 3/2010 | Fujimoto | |
| 2010/0062836 | A1 | 3/2010 | Young | |
| 2010/0093420 | A1 | 4/2010 | Wright | |
| 2010/0093444 | A1 | 4/2010 | Biggar et al. | |
| 2010/0105454 | A1 | 4/2010 | Weber | |
| 2010/0120525 | A1 | 5/2010 | Baerlocher et al. | |
| 2010/0124983 | A1 | 5/2010 | Gowin et al. | |
| 2010/0133747 | A1* | 6/2010 | Ruddell .................. | A63F 7/066 273/108.57 |
| 2010/0137047 | A1 | 6/2010 | Englman et al. | |
| 2010/0174593 | A1 | 7/2010 | Cao | |
| 2010/0184509 | A1 | 7/2010 | Sylla et al. | |
| 2010/0203940 | A1 | 8/2010 | Alderucci et al. | |
| 2010/0210344 | A1 | 8/2010 | Edidin et al. | |
| 2010/0227672 | A1 | 9/2010 | Amour | |
| 2010/0227688 | A1 | 9/2010 | Lee | |
| 2010/0240436 | A1 | 9/2010 | Wilson et al. | |
| 2010/0304825 | A1 | 12/2010 | Davis | |
| 2010/0304839 | A1 | 12/2010 | Johnson | |
| 2010/0304842 | A1 | 12/2010 | Friedman et al. | |
| 2011/0009177 | A1 | 1/2011 | Katz | |
| 2011/0009178 | A1 | 1/2011 | Gerson | |
| 2011/0045896 | A1 | 2/2011 | Sak et al. | |
| 2011/0077087 | A1 | 3/2011 | Walker et al. | |
| 2011/0082571 | A1 | 4/2011 | Murdock et al. | |
| 2011/0105206 | A1 | 5/2011 | Rowe et al. | |
| 2011/0107239 | A1 | 5/2011 | Adoni | |
| 2011/0109454 | A1 | 5/2011 | McSheffrey | |
| 2011/0111820 | A1 | 5/2011 | Filipour | |
| 2011/0111837 | A1 | 5/2011 | Gagner | |
| 2011/0111841 | A1 | 5/2011 | Tessmer | |
| 2011/0118011 | A1 | 5/2011 | Filipour et al. | |
| 2011/0201413 | A1 | 8/2011 | Oberberger | |
| 2011/0207523 | A1 | 8/2011 | Filipour et al. | |
| 2011/0212766 | A1 | 9/2011 | Bowers | |
| 2011/0212767 | A1 | 9/2011 | Barclay | |
| 2011/0218028 | A1 | 9/2011 | Acres | |
| 2011/0218035 | A1 | 9/2011 | Thomas | |
| 2011/0230258 | A1 | 9/2011 | Van Luchene | |
| 2011/0230260 | A1 | 9/2011 | Morrow et al. | |
| 2011/0230267 | A1 | 9/2011 | Van Luchene | |
| 2011/0244944 | A1 | 10/2011 | Baerlocher | |
| 2011/0263312 | A1 | 10/2011 | De Waal | |
| 2011/0269522 | A1 | 11/2011 | Nicely et al. | |
| 2011/0275440 | A1 | 11/2011 | Faktor | |
| 2011/0287828 | A1 | 11/2011 | Anderson et al. | |
| 2011/0287841 | A1 | 11/2011 | Watanabe | |
| 2011/0312408 | A1 | 12/2011 | Okuaki | |
| 2011/0319169 | A1 | 12/2011 | Lam | |
| 2012/0004747 | A1 | 1/2012 | Kelly | |
| 2012/0028718 | A1 | 2/2012 | Barclay et al. | |
| 2012/0058814 | A1 | 3/2012 | Lutnick | |
| 2012/0077569 | A1 | 3/2012 | Watkins | |
| 2012/0108323 | A1 | 5/2012 | Kelly | |
| 2012/0135793 | A1 | 5/2012 | Antonopoulos | |
| 2012/0202587 | A1 | 8/2012 | Allen | |
| 2012/0302311 | A1 | 11/2012 | Luciano | |
| 2012/0322545 | A1 | 12/2012 | Arnone et al. | |
| 2013/0029760 | A1 | 1/2013 | Wickett | |
| 2013/0131848 | A1 | 5/2013 | Arnone et al. | |
| 2013/0190074 | A1 | 7/2013 | Arnone et al. | |
| 2013/0260869 | A1 | 10/2013 | Basallo et al. | |
| 2014/0087801 | A1 | 3/2014 | Nicely et al. | |
| 2014/0087808 | A1 | 3/2014 | Basallo et al. | |
| 2014/0087809 | A1 | 3/2014 | Leupp et al. | |

FOREIGN PATENT DOCUMENTS

| | | | |
|---|---|---|---|
| JP | H11-319185 | A | 11/1999 |
| JP | 2000210465 | A | 8/2000 |
| JP | 2001300098 | A | 10/2001 |
| JP | 2003111980 | A | 4/2003 |
| JP | 2004097610 | A | 4/2004 |
| JP | 2004166746 | A | 6/2004 |
| KR | 20010011240 | A | 2/2001 |
| WO | 9808581 | A1 | 3/1998 |
| WO | 9851384 | A1 | 11/1998 |
| WO | 2010087090 | A1 | 8/2010 |
| WO | 2011109454 | A1 | 9/2011 |

(56) References Cited

FOREIGN PATENT DOCUMENTS

| | | | |
|---|---|---|---|
| WO | 2012139083 | A1 | 10/2012 |
| WO | 2013059308 | A1 | 4/2013 |

OTHER PUBLICATIONS itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.

Changing the Virtual Self: Avatar Transformations in Popular Games; Barr et al., Victoria Univ., NZ, 2006.

Real-Time Multimodal Human-Avatar Interaction; Li et al., IEEE (Video Technology) vol. 18, No. 4, 2008.

International Search Report and Written Opinion, PCT/US2012/58156, Feb. 1, 2013.

WIPO/IPEA International Preliminary Report on Patentability, PCT/US12/58156, Sep. 13, 2013.

Japan Patent Office, Office Action, Japan Patent Application No. 2014-533443, Oct. 6, 2015.

* cited by examiner

ELECTROMECHANICAL HYBRID GAMING SYSTEM

CROSS REFERENCE TO RELATED APPLICATIONS

The present application is a continuation of U.S. patent application Ser. No. 14/339,142, filed Jul. 23, 2014, now U.S. Pat. No. 8,944,899 issued on Feb. 3, 2015, which is a continuation of U.S. patent application Ser. No. 13/917,513, filed Jun. 13, 2013 now U.S. Pat. No. 8,790,170 issued on Jul. 29, 2014, which is a continuation of Patent Cooperation Treaty Application No. PCT/US12/58156, filed Sep. 29, 2012, which claims the benefit of U.S. Provisional Application No. 61/626,653, filed Sep. 30, 2011, the contents of which are hereby incorporated by reference in its entirety.

FIELD OF THE INVENTION

The present invention is generally related to gaming and more specifically to skill-based gaming using an electromechanical game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

SUMMARY OF THE INVENTION

Systems in accordance with embodiments of the invention operate an electromechanical (EM) hybrid gaming system including a real world engine configured to provide a randomly generated payout for a gambling game; an electromechanical game system connected to an entertainment game user interface that senses an action by a player during skillful execution of an electromechanical table game, wherein the electromechanical game system is constructed to manage the electromechanical table game including an actuator that affects a goal of the electromechanical table game, wherein outcomes of the electromechanical table game are based upon actions performed by the player during skillful execution of the electromechanical table game when scoring using the goal, wherein the electromechanical game system operates the actuator based on an outcome of the randomly generated payout for the gambling game to increase a game difficulty level upon a loss outcome of the gambling game and to decrease a game difficulty level upon a win outcome of the gambling game. The system also includes a game world engine connected to the electromechanical game system and the real world engine, the game world engine constructed to communicate, to the real world engine, gameplay gambling event occurrences based upon the sensed actions by the player during the player's skillful execution of the electromechanical table game, wherein the gameplay gambling event occurrences communicated by the game world engine to the real world engine trigger the randomly generated payout for the gambling game.

In a further embodiment, the outcomes of the electromechanical table game are based upon a consumption of at least one element used to further game play and the action by the player is a choice made that affects the consumption of at least one element.

In a further embodiment, the actuator operates differently dependent upon a setting for an entertainment game difficulty level.

In a further embodiment, operating the actuator based on an outcome of the randomly generated payout for the gambling game to increase a game difficulty level upon a loss outcome of the gambling game includes decreasing a size of the goal.

In a further embodiment, operating the actuator based on an outcome of the randomly generated payout for the gambling game to decrease a game difficulty level upon a win outcome of the gambling game includes increasing a size of the goal.

In a further embodiment, operating the actuator based on an outcome of the randomly generated payout for the gambling game to increase a game difficulty level upon a loss outcome of the gambling game and to decrease a game difficulty level upon a win outcome of the gambling game includes affecting electromechanical table game play via a rate at which the goal moves to alter a difficulty of scoring.

In a further embodiment, the game world engine is configured to award game world credit based upon a player's skillful execution of the electromechanical table game.

In a further embodiment, the electromechanical hybrid game is network connected to communicate with remote servers.

In a further embodiment, the electromechanical hybrid game is network connected to communicate with a server selected from the group consisting of: a real world engine server, a game world patron management server, a game world engine server and an electromechanical game system server.

In a further embodiment, the real world engine server is configured to provide a randomly generated payout for the gambling game.

Another embodiment includes an electromechanical hybrid gaming system, including: an electromechanical game system connected to an entertainment game user interface that senses an action by a player during skillful execution of an electromechanical table game, wherein the electromechanical game system is constructed to manage the electromechanical table game including an actuator that affects a goal of the electromechanical table game, wherein outcomes of the electromechanical table game are based upon actions performed by the player during skillful execution of the electromechanical table game when scoring using the goal, wherein the electromechanical game system operates the actuator based on an outcome of a randomly generated payout for a gambling game to increase a game difficulty level upon a loss outcome of the gambling game and to decrease a game difficulty level upon a win outcome of the gambling game; and a game world engine connected to the electromechanical game system and a real world engine providing the randomly generated payout for the gambling game, wherein the game world engine is constructed to communicate, to the real world engine, gameplay gambling event occurrences based upon the sensed actions by the player during the player's skillful execution of the electromechanical table game, wherein the gameplay gambling event occurrences communicated by the game world engine to the real world engine trigger the randomly generated payout for the gambling game.

Another embodiment includes a real world engine configured to provide a randomly generated payout for a gambling game; and a game world engine connected to an electromechanical game system and the real world engine, the electromechanical game system connected to an entertainment game user interface that senses an action by a player during skillful execution of an electromechanical table game, wherein the game world engine is constructed to: manage the electromechanical game system, wherein the electromechanical game system operates an actuator that affects a goal of the electromechanical table game based on an outcome of the randomly generated payout for the gambling game to increase a game difficulty level upon a loss outcome of the gambling game and to decrease a game difficulty level upon a win outcome of the gambling game; and communicate, to the real world engine, gameplay gambling event occurrences based upon the sensed actions by the player during the player's skillful execution of the electromechanical table game, wherein the gameplay gambling event occurrences communicated by the game world engine to the real world engine trigger the randomly generated payout for the gambling game.

DETAILED DESCRIPTION

Turning now to the drawings, systems and methods for operation of an electromechanical (EM) hybrid game are illustrated. In several embodiments, an EM hybrid game a form of a hybrid game that integrates both a gambling game that includes a real world engine (RWE) which manages the gambling game, as well as an entertainment game that includes a game world engine (GWE) which manages the entertainment portion of a game, and an electromechanical (EM) game system (EGS) which executes an EM game for player entertainment. The EM game can be any game that utilizes both mechanical and electrical components, where the game operates as a combination of mechanical motions performed by at least one player or the EM game itself. Examples of EM games include (but are not limited to) table soccer, table hockey, pool, table tennis, air hockey, skee ball and pop-a-shot arcade basketball. EM games are distinguished from other arcade or video games because a player does not interact with the game predominantly through a video screen and software system, though software may play a limited role such as (but not limited to) recording and displaying the score, operating a bill validator, or dispensing tickets or coupons at the completion of game play. Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety.

In many embodiments, an EM hybrid game is network connected and able to access resources found on remote servers. These servers can include a RWE server that generates random outcomes for a gambling game, GW patron management server that manages EM hybrid game player accounts, GWE server that manages entertainment game play and an EGS server that manages multiplayer EM hybrid game play.

Although specific electromechanical hybrid games are discussed above, electromechanical hybrid games can be implemented in a variety of ways appropriate to the requirements of a specific application in accordance with embodiments of the invention. Electromechanical hybrid games in accordance with embodiments of the invention are discussed further below.

Electromechanical Hybrid Games

Figure 1A:
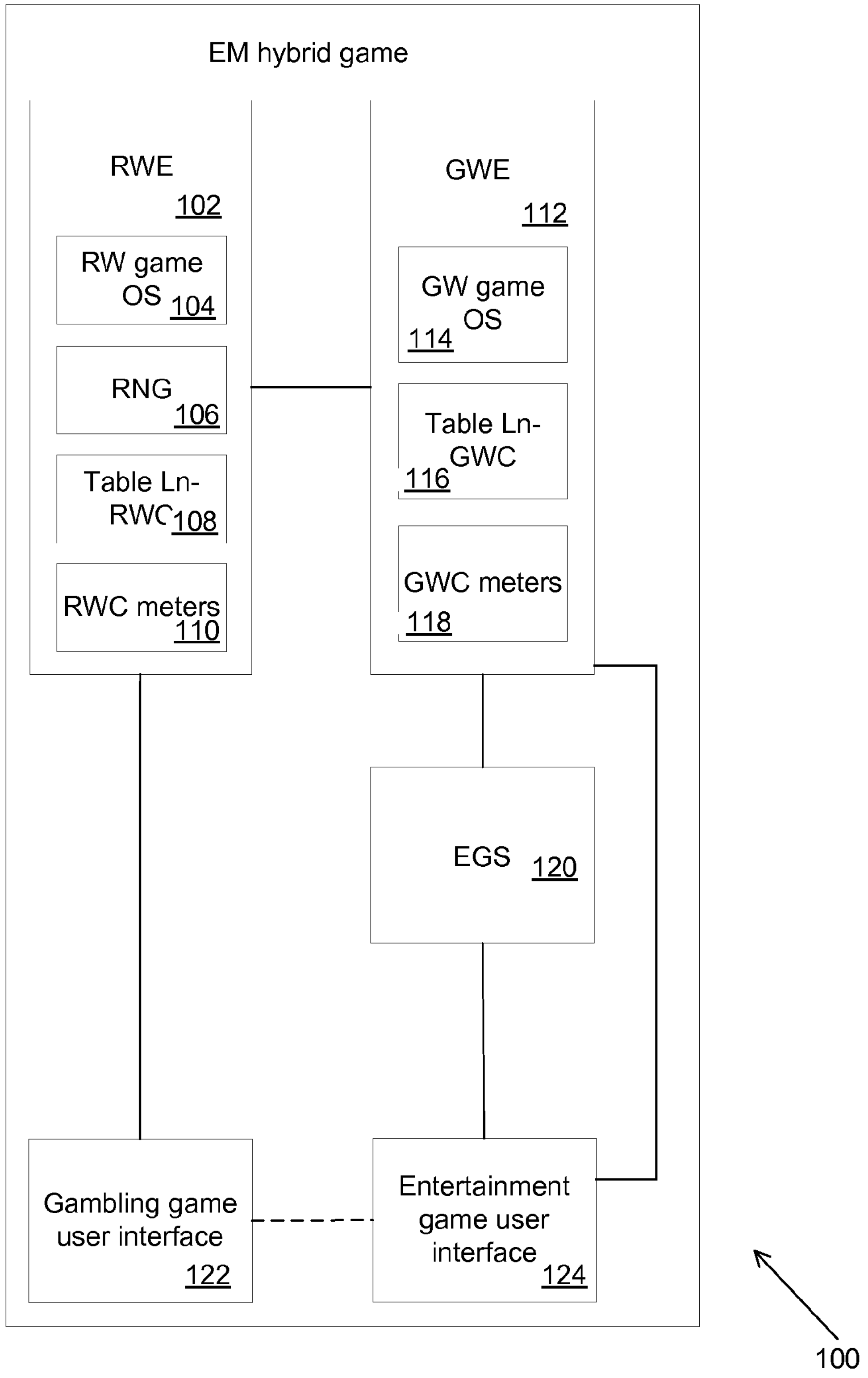
FIG. 1A illustrates an electromechanical (EM) hybrid game in accordance with an embodiment of the invention.

EM hybrid games in accordance with many embodiments provide high levels of entertainment content in an entertainment game with a gambling experience from a gambling game. These EM hybrid games provide for a random outcome independent of player skill while ensuring that the player's gaming experience (as measured by obstacles/challenges encountered, time of play and other factors) is shaped by the player's skill. An EM hybrid game in accordance with an embodiment of the invention is illustrated in FIG. 1A. The EM hybrid game includes a RWE 102, GWE 112, EGS 120, gambling game user interface 122 and entertainment game user interface 124. The two user interfaces may be part of the same user interface but are separate in the illustrated embodiment. The RWE 102 is connected with the GWE 112 and the gambling game user interface 122. The EGS 120 is connected with the GWE 112 and the entertainment game user interface 124. The GWE 112 is connected also with the entertainment game user interface 124.

In several embodiments, The RWE 102 is the an operating system for the gambling game of the hybrid game and controls and operates the gambling game. The operation of a gambling game is enabled by real world credits (RWC) which can be money, such as real funds, accretes and declinates real gambling credits based on random gambling outcome, and where the gambling game is typically regulated by gaming control bodies. In many embodiments, the RWE includes a real world (RW) operating system (OS) 104, random number generator (RNG) 106, level "n" real-world credit pay tables (Table Ln-RWC) 108, RWC meters 110 and other software constructs that enable a game of chance to offer a fair and transparent gambling game, and to contain the auditable systems and functions that can enable the game to obtain gaming regulatory body approval.

A random number generator (RNG) 106 includes software and/or hardware, algorithms and/or processes, which are used to generate random outcomes. A level n real-world credit pay table (Table Ln-RWC) 108 is a table that can be used in conjunction with a random number generator (RNG) 106 to dictate the real world credits (RWC) earned as a function of game play and is analogous to the pay tables used in a conventional slot machine. Table Ln-RWC payouts are independent of player skill. There may be one or a plurality of Table Ln-RWC pay tables 108 contained in a gambling game, the selection of which may be determined by factors including (but not limited to) game progress a player has earned, and/or bonus rounds which a player may be eligible for. RWC can be analogous to slot machine game credits, which are entered into a gambling game by the player, either in the form of money such as hard currency or electronic funds. RWCs can be decremented or augmented based on the outcome of a random number generator according to the Table Ln-RWC real world credits pay table 108, independent of player skill. In certain embodiments, an amount of RWC can be required to enter higher EGS game levels. RWC can be carried forward to higher game levels or paid out if a game cash out is opted for by a player. The amount of RWC required to enter a specific level of the game need not be the same as another level.

In many embodiments, the GWE 112 manages the overall hybrid game operation, with the RWE 102 and the EGS 120 effectively being support units to the GWE 112. In several embodiments, the GWE 112 contains the mechanical, electronic and software system for an entertainment game. The GWE 112 includes a GW game operating system (OS) 114 that provides control of the entertainment game. The GWE additionally contains a level "n" game world credit pay table (Table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the EGS 120.

In many embodiments, a level "n" game world credit pay table (Table Ln-GWC) 116 dictates the GWC earned as a function of player skill in the nth level of the game. The payouts governed by this table are dependent upon player skill and game play at large and may or may not be coupled to a random number generator. In several embodiments, game world credits (GWC) are player points earned or depleted as a function of player skill, i.e. as a function of player performance in the context of the game. GWC is analogous to the "score" in a typical game. Each game has one or more scoring criterion, embedded within the Table Ln-GWC 116 that reflects player performance against the goal(s) of the game. GWC can be carried forward from one level of game play to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In certain embodiments, the operation of the GWE does not affect the RWE's gambling operation except for player choice parameters that are allowable in slot machines today including but not limited to the wager amount, how fast the player wants to play (such as but not limited to by shooting basketballs into a hoop) and/or agreement to wager into a bonus round. In this sense, the RWE 102 provides a fair and transparent, non-skill based gambling game co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a necessary status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the player's user interface directly, as this may be necessary to communicate certain entertainment game club points, player status, control the selection of choices and messages which a player may find useful in order to adjust their entertainment game experience or understand their gambling status in the RWE 102.

In a number of embodiments, the communication link between an RWE and a GWE can send information from the GWE to the RWE including (but not limited to): occurrence of a gameplay gambling event where an entertainment game event triggers a wager in the gambling game, RWC to wager per gambling game, number of gambling games to play per minute, to enter or decline a bonus round, any additional RWC given to a player by an operator of the EM hybrid game, and information useful for auditing including (but not limited to) information related to the type of GWE, player profile and status, Table Ln-GWC table, GWC points and other information useful to an audio. Information that is sent from a RWE to a GWE can include (but is not limited to) RWE or gambling game status, gambling play result, Table Ln-RWC table information, gambling game patron/player system data, possibility of bonus round entry, gambling game monetary denominations or RWE game operating parameters.

In various embodiments, the EGS 120 manages and controls the mechanical performance of the entertainment game as an EM game. In certain embodiments, the EGS 120 accepts input from a player through a set of mechanical controls that affects EM game play. In many embodiments, the EGS 120 can exchange data with and accept control information from the GWE 112. In several embodiments an EGS 120 can be implemented with any EM game, such as (but are not limited to) table soccer, table hockey, pool, table tennis, air hockey, skee ball and pop-a-shot arcade basketball.

The EGS 120 operates mostly independent from the GWE 112, except that via the interface, the GWE 112 may send certain GW game control parameters to the EGS 120 to affect its play, such as (but not limited to) what the number of skee balls available to be played, the presence of obstacles or obstructions on the field of the EM game, opportunities for bonus scoring in the EM game (such as but not limited to a basketball shot being worth three points instead of two), and the rate at which a basketball hoop moves left to right to alter the difficulty of scoring. The EGS 120 can accept input from the GWE 112, make adjustments, and continue the play action all the while running seamlessly from the player's perspective. The EGS's operation is mostly skill based, except for where the EGS's algorithm may inject complexities into the game by chance in its normal operation to create unpredictability in the entertainment game. Utilizing this interface, the EGS 120 may also communicate player choices made in the EM game to the GWE 112. The GWE's job in this architecture, being interfaced thusly to the EGS 120, is to allow the transparent coupling of entertainment software to a fair and transparent random chance gambling game, providing a seamless perspective to the player that they are playing a typical popular entertainment game (which is skill based). In certain embodiments, the EGS 120 can be used to enable a wide range of games including but not limited to table tennis, foosball, 9-ball or table hockey.

In numerous embodiments, a GWE and EGS can exchange data with each other. Information sent from a GWE to an EGS can include (but is not limited to) EGS game software, EGS game difficulty settings, game score enhancements, cheats for an EGS game, character or player profile setup, equipment inventory and random complexity mods. Information sent from an EGS to a GWE can include (but is not limited to) player choices through an EGS user interface, character profile in the entertainment game, game scores, random complexity rating, language selection and tournament and multi-player information.

In several embodiments, the RWE 102 can accept a trigger to run a gambling game in response to actions taken by the player in the entertainment game as conveyed by the EGS 120 to the GWE 112, or as triggered by the GWE 112 based on its algorithms, background to the overall EM game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of games per minute the RWE 102 can execute, entrance into a bonus round, and other factors, all the while these factors can take a different form than that of a typical slot machine. An example of a varying wager amount that the player can choose can include (but is not limited to) play with a more expensive (in terms of RWC) ball in a game of foosball. These choices can increase or decrease the amount wagered per individual gambling game, in the same manner that a standard slot machine player may decide to wager more or less credits for each pull of the handle. In several embodiments, the RWE 102 can communicate a number of factors back and forth to the GWE 112, via an interface, such increase/decrease in wager being a function of the player's decision making. In this manner, the player is always in control of the per game wager amount, with the choice mapping to some parameter or component that is applicable to the entertainment game experience of the EM hybrid game.

In many embodiments, a EM hybrid game integrates a gambling machine, where the gambling game (i.e. RWE 102 and RWC) is not player skill based, while at the same time allows players to use their skills at an entertainment game to earn GWC, such as but not limited to club points, which a casino operator can translate to rewards, tournament opportunities and prizes for the players. The actual exchange of monetary funds earned or lost directly from gambling against a game of chance, such as a slot machine, is preserved. At the same time a rich environment of rewards to stimulate players can be established with the entertainment game. In several embodiments, the hybrid game can leverage popular EM games to provide a sea change environment for casinos to attract players with EM games that are more akin to the type of entertainment which a younger generation desires. In various embodiments, players can use their skill towards building and banking GWC which in turn can be used to win tournaments and various prizes as a function of player prowess.

In certain embodiments, hybrid games also allow players to gain entry into subsequent competitions through the accumulation of game world credits (GWC) that accrue as a function of the player's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue.

Figure 1B:
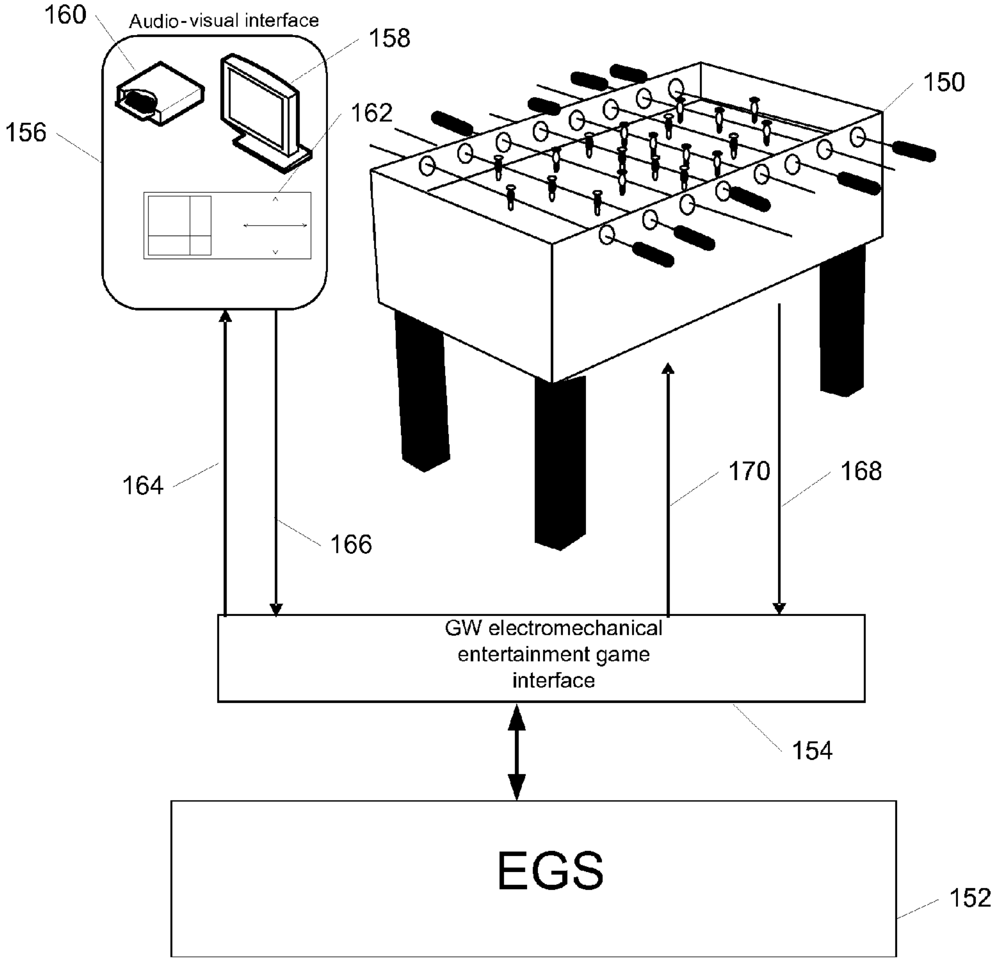
FIG. 1B illustrates an electromechanical game system (EGS) of an EM game in accordance with an embodiment of the invention.

FIG. 1B illustrates an EGS with an EM game in accordance with an embodiment of the invention. An EM game 150 is connected to an EGS 152 via a GW electromechanical entertainment game interface 154. The GW electromechanical entertainment game interface 154 also connects an audio-visual interface 156 to the EGS 152. The audio-visual interface 156 includes devices used to communicate (164) instructions and game status to one or more players of the electromechanical entertainment game 150 and to receive (166) inputs from the one or more players. Examples of the audio-visual interface 156 can include (but are not limited to) a monitor and/or a touch screen display 158, a bill validator (not shown), player card reader 160 or a keyboard 162.

The electromechanical entertainment game 150 includes sensors (not shown) that sense player actuation of controls, game play events and the position of various game play elements. Examples of the sensors can include (but are not limited to) goal sensors, ball position sensors, ball type sensors, rod position and rotation sensors. The EGS 152 receives (168) signals from the sensors indicating the player actuation of controls, game play events and the position of various game play elements via the GW electromechanical entertainment game interface 154.

The EM game 150 also includes actuators (not shown) that can be controlled (170) by the EGS 152 via the GW electromechanical entertainment game interface 154. The actuators control various elements of the EM game 150 and can affect the difficulty level of EM game 150 as described herein. For example, in the case of a basketball themed game, the difficulty level of the EM game 150 can be increased or decreased by affecting a rate at which a basketball hoop moves left to right to alter the difficulty of scoring. In various embodiments, other elements may be affected through the use of actuators such as goal size (such as but not limited to a smaller or larger goal), available players (such as but not limited to a row of foosball men or a table top hockey player), friction on the control mechanisms (such as but not limited to foosball or table top hockey rods with variable resistance), introducing into the game play a new or different element such as a ball or hockey puck of a different color (such as but not limited to where a blue air hockey puck might correlate to higher RWC wagers than a red hockey puck), amount of time available for game play (such as but not limited to where a game clock could run faster or slower and affect the pace of wagers made), presence of special targets or obstructions (such as but not limited to special targets that can be provided in skee ball). Although particular factors are listed above that can relate an entertainment game to a gambling game, any factor can be utilized to set a relationship between an entertainment game and a gambling game as appropriate to the requirements of a specific application in accordance with embodiments of the invention.

During game play, one or more players can use the audio-visual interface 156 to insert RWC (such as, but not limited to, vouchers, bills, coins, player or credit cards) and make player selections (such as, but not limited to, the number of players, side bets, form of competition, or RWC to be wagered) to configure the EM game 150. The EGS 152 then receives the player inputs from the audio-visual interface 156 via the GW electromechanical entertainment game interface 154. When the one or more players begin playing the EM game 150, the EGS 152 monitors the game play of the EM game 150 by receiving sensor signals from the sensors in the EM game via the GW electromechanical entertainment game interface 154. When it is determined, such as through configuration or based on the outcome of a gambling event, that the level of difficulty of the game play of the EM game 150 is to be modified, the EGS 152 controls (170) one or more actuators of the EM game 150 via the GW electromechanical entertainment game interface 154.

Although various configurations of EM hybrid games are discussed above, EM hybrid games can be configured in any manner as appropriate to the requirements of a specific application in accordance with embodiments of the invention. Networked EM hybrid games are discussed below.

Network Connected Electromechanical Hybrid Game

EM hybrid games in accordance with many embodiments of the invention can operate locally while being network connected to draw services from remote locations or to communicate with other hybrid games. In many embodiments, operations associated with an EM hybrid game can be performed across multiple devices, such as (but not limited to) controllers of an EM game, user interfaces, processing for calculating score or RWC and GWC tracking. These multiple devices can be implemented using or in connection with a single server or a plurality of servers such that an EM hybrid game is executed as a system in a virtualized space, such (but not limited to) where the RWE and GWE are large scale centralized servers “in the cloud” coupled to a plurality of widely distributed EGS controllers or clients via the Internet.

In many embodiments, an RWE server can perform certain functionalities of a RWE of a hybrid game. In certain embodiments, a RWE server includes a centralized odds engine which can generate random outcomes (such as but not limited to win/loss outcomes) for a gambling game, thereby eliminating the need to have that functionality of the RWE performed locally within the EM hybrid game. The RWE server would be capable of performing a number of simultaneous or pseudo-simultaneous runs in order to generate random outcomes for a variety of odds percentages that one or more networked EM hybrid games may require. In certain embodiments, an RWE of an EM hybrid game can send information to a RWE server including (but not limited to) Table Ln-RWC tables, maximum speed of play for a gambling game, gambling game monetary denominations or any promotional RWC provided by the operator of the EM hybrid game. In particular embodiments, a RWE server can send information to a RWE of an EM hybrid game including (but not limited to) RWC used in the gambling game, player account information or play activity and a profile associated with a player.

In several embodiments, a GWE server can perform the functionality of the GWE across various hybrid games. These functionalities can include (but are not limited to) providing a method for monitoring high scores on select groups of games, linking groups of games in order to join them in head to head tournaments, and acting as a tournament manager.

In a variety of embodiments, management of player account information can be performed by a GWE patron management server separate from a GWE server. A GWE patron management server can manage player account information, including (but not limited to) data concerning players' characters, players' game scores, players' RWC and GWC and managing tournament reservations. Although a GWE patron management server is discussed separate from a GWE server, in certain embodiments a GWE server also performs the functions of a GWE patron management server. In certain embodiments, a GWE of an EM hybrid game can send information to a GW patron management server including (but not limited to) GWC and RWC used in a game, player account information, play activity and profile information for players and synchronization information between a gambling game and an entertainment game or other aspects of an EM hybrid game. In particular embodiments, a GW patron management server can send information to a GWE of an EM hybrid game including (but not limited to) entertainment game title and type, tournament information, Table Ln-GWC tables, special offers, character or profile setup and synchronization information between a gambling game and an entertainment game or other aspects of an EM hybrid game.

In numerous embodiments, an EGS server provides a host for managing head-to-head play, operating on the network of EGSs which are connected to the EGS server by providing an environment where players can compete directly with one another and interact with other players. Although an EGS server is discussed separate from a GWE server, in certain embodiments a GWE server also performs the functions of an EGS server.

Servers connected with EM hybrid games over a network in many embodiments of the invention can communicate with each other to provide services to an EM hybrid game. In several embodiments a RWE server can communicate with a GWE server. A RWE server can communicate with a GWE server to communicate any type of information as appropriate for a specific application, including (but not limited to): configure the various simultaneous or pseudo simultaneous odds engines executing in parallel within the RWE to accomplish the EM hybrid game system requirements, determine metrics of RWE performance such as random executions run and outcomes for tracking system performance, perform audits, provide operator reports, and request the results of a random run win/loss result for use of function operating within the GWE (such as where automatic drawings for prizes are a function of EGS performance).

In several embodiments a GWE server can communicate with an EGS server. A GWE server can communicate with an EGS server to communicate any type of information as appropriate for a specific application, including (but not limited to): the management of an EGS server by a GWE server such as the management of an EM game tournament. Typically a GWE (such as a GWE that runs within a EM hybrid game or on a GWE server) is not aware of the relationship of itself to the rest of a tournament since in a typical configuration the actual tournament play is managed by the EGS server. Therefore, management of an EM game tournament can include (but is not limited to) tasks such as: conducting tournaments according to system programming that can be coordinated by an operator of the EM hybrid game; allowing entry of a particular player into a tournament; communicating the number of players in a tournament and the status of the tournament (such as but not limited to the amount of surviving players, their status within the game, time remaining on the tournament); communicating the status of an EGS contained in a game; communicating the performance of its players within the tournament; communicating the scores of the various members in the tournament; and providing a synchronizing link to connect the GWEs in a tournament, with their respective EGS's.

In several embodiments a GWE server can communicate with a GW patron server. A GWE server can communicate with a GW patron server to communicate any type of information as appropriate for a specific application, including (but not limited to) information for configuring tournaments according to system programming conducted by an operator of an EM hybrid game, exchange of data necessary to link a player's profile to their ability to participate in various forms of game play (such as but not limited to the difficulty of play set by the GWE server or the GWE in the game they are playing on), determining a player's ability to participate in a tournament as a function of a player's characteristics (such as but not limited to a player's gaming prowess or other metrics used for tournament screening), configuring the game contained GWE and EGS performance to suit preferences of a player on a particular EM hybrid game, as recorded in their player account, determining a player's play and gambling performance for the purposes of marketing intelligence, and logging secondary drawing awards, tournament prizes, RWC and GWC into the player's account.

In many embodiments, the actual location of where various algorithms and functions are executed may be located either in the game contained devices (RWE, GWE, EGS), on the servers (RWE server, GWE server, or EGS server), or a combination of both. In particular embodiments, certain functions of a RWE server, GWE server, GW patron server or EGS server may operate on the local RWE, GWE or EGS contained with an EM hybrid game locally. In certain embodiments, a server is a server system including a plurality of servers, where software may be run on one or more physical devices. Similarly, in particular embodiments, multiple servers may be combined on a single physical device.

Figure 2A:
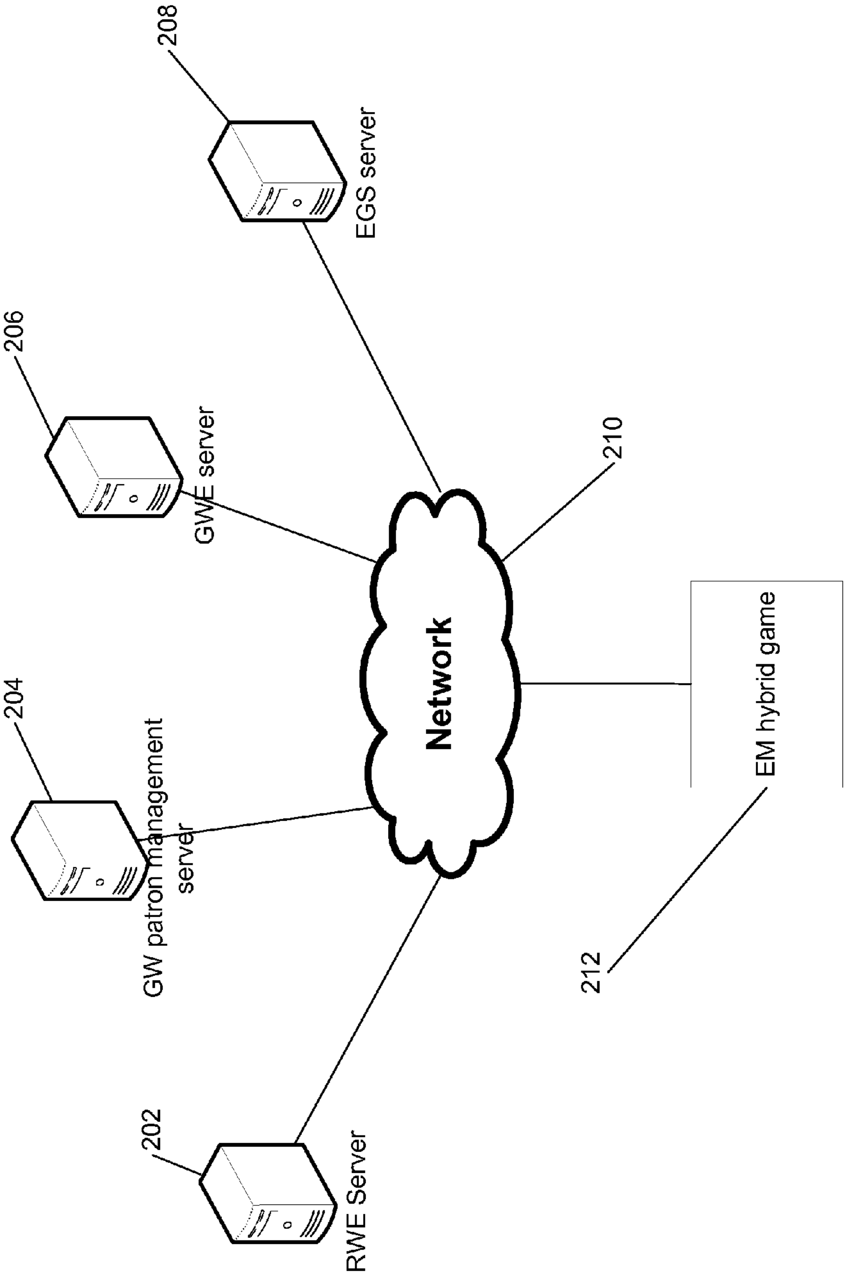
FIG. 2A illustrates a network connected EM hybrid game in accordance with an embodiment of the invention.
Figure 2B:
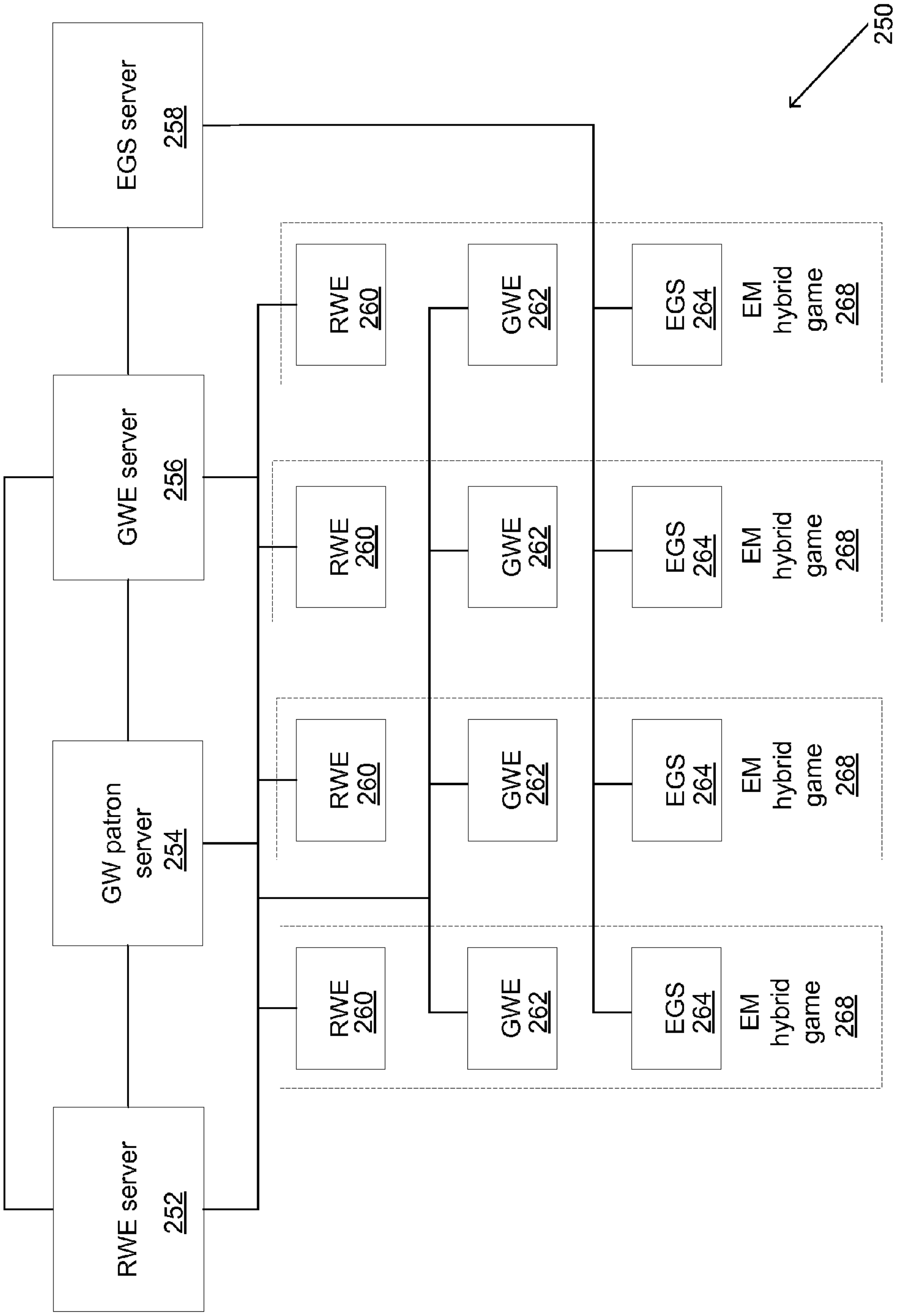
FIG. 2B illustrates communication connections between components of the network connected EM hybrid game in accordance with an embodiment of the invention.

EM hybrid games in accordance with many embodiments of the invention can be networked with remote servers in various configurations. A network connected EM hybrid game in accordance with an embodiment of the invention is illustrated in FIG. 2A. The EM hybrid game 212 is connected with a RWE server 202, GW patron management server 204, GWE server 206 and EGS server 208 over a network 210, such as (but not limited to) the Internet. Servers networked with an EM hybrid game 212 can also communicate with each of the components of an EM hybrid game and amongst the other servers in communication with the EM hybrid game 212. Communication between components of network connected EM hybrid games and various servers in accordance with an embodiment of the invention is illustrated in FIG. 2B. Each of the EM hybrid games 268 include components such as an RWE 260, GWE 262 and EGS 264. In turn the RWEs 260 and GWEs 262 are each in communication with to the RWE server 252, GW patron server 252 and/or GWE server 256. Similarly, each EGS 264 is in communication with the EGS server 258. Among the servers, the RWE server 252 is in communication with the GW patron server 254 and the GWE server 256, the GW patron server 254 is also in communication with the GWE server 256, and the GWE server 256 is also in communication with the EGS server 258. In many embodiments, the GW patron server 254 is subsumed within a GWE server 256. In several embodiments, an EM hybrid game's balance between an entertainment game and a gambling game is accomplished by the communication between the RWE server 252 and each of a GW patron server 254 and the GWE server 256. Similarly, the utilization of an EM game is accomplished from the communication between the GWE 256 server and the EGS server 258.

Although various configurations of networked EM hybrid games are discussed above, networked EM hybrid games can be configured in any manner as appropriate to the requirements of a specific application in accordance with embodiments of the invention. Operation of an EM hybrid game is discussed further below.

Electromechanical Hybrid Game Operation

EM hybrid games in accordance with many embodiments can configure any of a variety of EM games to operate as part of the EM hybrid game. In many embodiments, the GWE of an EM hybrid game (using a local GWE or a remote GWE server or GW patron server) can manage a player's interactions with the EM hybrid game using a player account that identifies the player and enables the EM hybrid game to aggregate or process information related to a specific player. A player account can include any information related to a player, such as GW or RW parameters which may affect the gambling game. In the case of such factors which would impact the gambling game, the implications of choices the player would make and their effects on the gambling game would be clearly disclosed to the player. In certain embodiments, a choice that a player could make can include (but is not limited to) the selection of a certain color ball in a skee ball game may result in 2 RWC instead of 1 RWC bet on each gambling play of the RWE, or a variable wager of RWC dependent upon the size of a ball used in a basketball target game. Therefore, a player's choices while playing the entertainment game can enhance or retard their performance at the gambling game, but in all cases, the choice and the cost are clearly disclosed to the player who makes the choice. During these selection periods, the RWE's operation would be suspended for a reasonable amount of time so a player may have sufficient time to make a choice proper for them based on the funds they have available to responsibly play with, considered against how much they wish to advance their performance in the entertainment game. Many different factors can determine the relationship between play of an entertainment game and a gambling game of a EM hybrid game, including (but not limited to) the size of a RWC wager, entering of bonus rounds and the use of RWC in the gambling game, ball size or weight (including but not limited to a smaller diameter basketball, a heavier basketball), goal size (such as but not limited to a smaller or larger goal), available players (such as but not limited to a row of foosball men or a table top hockey player), friction on the control mechanisms (such as but not limited to foosball or table top hockey rods with variable resistance), color of a ball or hockey puck (such as but not limited to where a blue air hockey puck might correlate to higher RWC wagers than a red hockey puck), amount of time available for game play (such as but not limited to where a game clock could run faster or slower and affect the pace of wagers made), presence of special targets or obstructions (such as but not limited to special targets that can be provided in skee ball). Although particular factors are listed above that can relate an entertainment game to a gambling game, any factor can be utilized to set a relationship between an entertainment game and a gambling game as appropriate to the requirements of a specific application in accordance with embodiments of the invention.

In several embodiments, the entertainment game dynamically adjusts its difficulty in response to the player's skill as perceived by the system. While this has no effect on the ultimate outcome of the gambling game from a RWC perspective, it gives the player a custom experience tailored to his or her abilities. This dynamic adjustment of difficulty can be used to effect the payout of GWC as embodied in Table Ln-GWC and by virtue of presenting more valuable (from an entertainment game perspective) challenges to the player to be overcome.

In numerous embodiments, an operator can manage player accounts in a GWE to set a number of thresholds within the entertainment game or gambling game such as (but not limited to) to trigger automatic awards, elevate players to enhanced standing or retard their status, make them eligible for tournaments, prizes, secondary drawings and other such experience enhancements. In certain embodiments, an operator can program a GWE server and/or a GWE patron management server with the desired thresholds, and these servers in turn would configure the game contained GWE's to monitor entertainment game play so as to identify matches to the specified thresholds. Signaling between the devices and servers can ensure that the appropriate awards, eligibility and other actions were properly recorded for a given player and their characters, and that said players where suitably informed as to these changes in status, awards, or eligibility.

In several embodiments, player accounts can be utilized to manage competitions among players of the EM game of the EGS. Thereby, players can compete head-to-head to win GWC in the entertainment game, and gambling games can be initiated independently for each player, or jointly. In certain embodiments within a foosball type EM game executing in an EGS, each player independently puts credits into the game and is provided a certain number of balls in exchange. Every time a player scores a goal, a gambling game is undertaken on behalf of the scoring player. If the gambling game leads to an increase in RWC, the player also receives additional balls for use within the foosball type EM game. In this regard, even if the other player doesn't score goals, they benefit from the RWC wins of the other player by gaining the benefit of extended play time on the foosball type EM game. In another embodiment, players jointly contribute RWC to the game, share a pool of balls, and gambling game wins accrue to the players jointly.

In many embodiments, an EM game includes games altered to include sensors that record actions undertaken by a player playing the EM game and/or the position and/or velocity of elements within the game. In certain embodiments, a table soccer game might be outfitted with sensors that measure the radial and axial position of each player actuator, a sensor or sensors that establish when a goal has been scored, sensors on the table surface that can recognize the position of the ball, and sensors that recognize when a ball is introduced to the game through the entry hole located on each side of the table.

Figure 3:
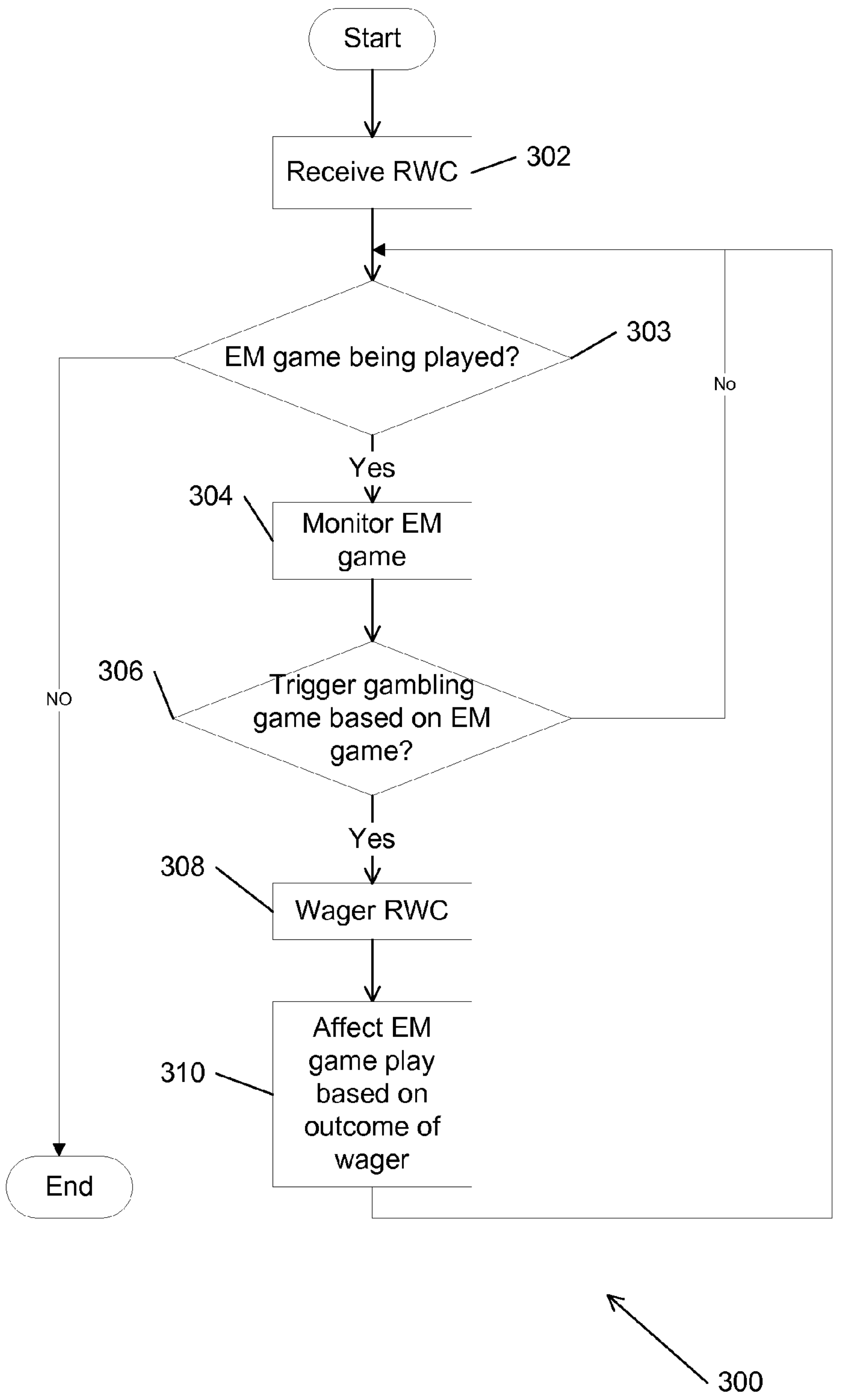
FIG. 3 illustrates a process in which an EM hybrid game is utilized in accordance with an embodiment of the invention.
Figure 4:
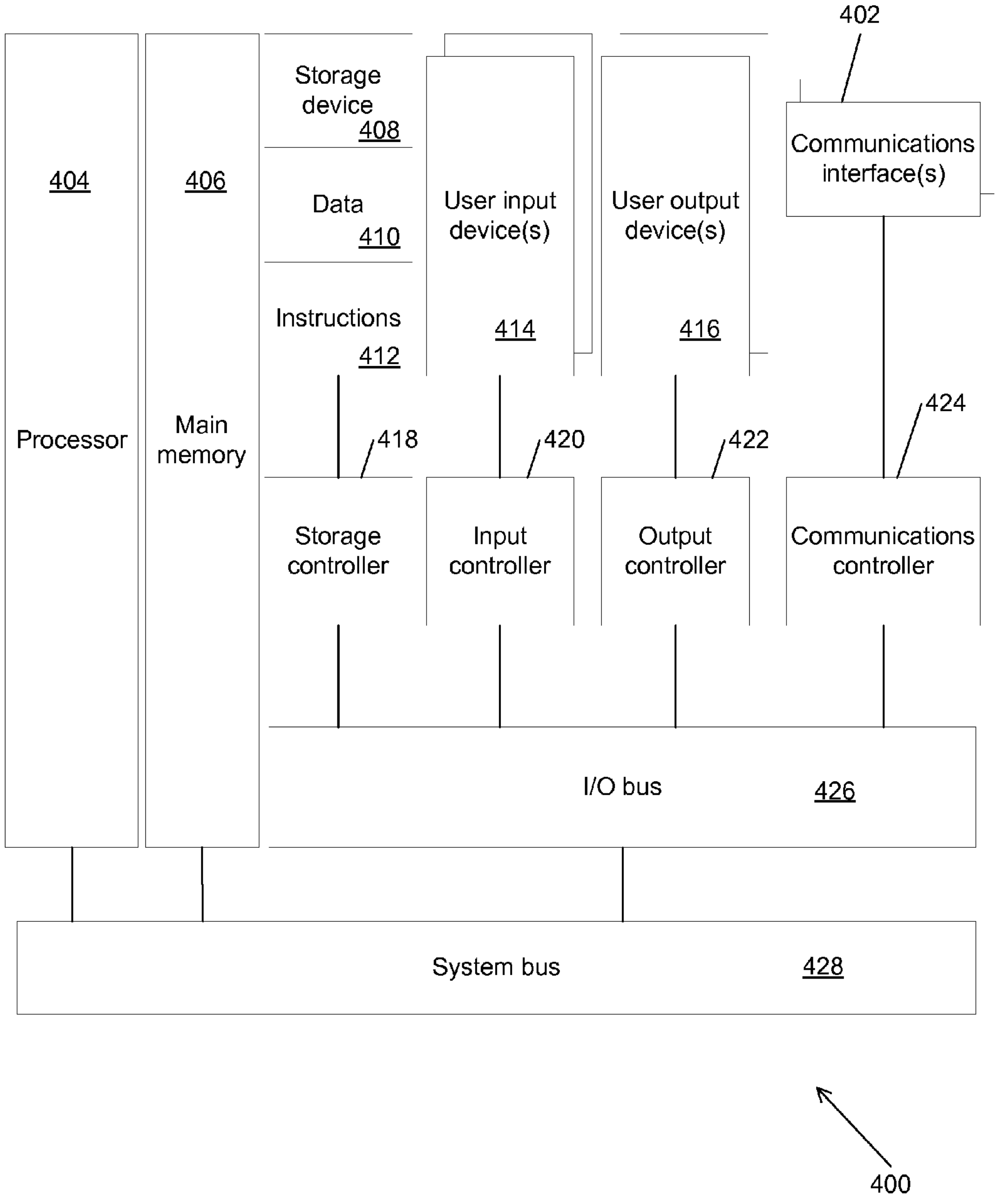
FIG. 4 illustrates a hardware architecture diagram of a processing apparatus used in an EM hybrid game in accordance with an embodiment of the invention.

A process by which an EM hybrid game is utilized in accordance with an embodiment of the invention is illustrated in FIG. 3. The process 300 includes receiving (302) RWC. RWC can be received (302) such as (but not limited) by feeding money into an EM hybrid game or by otherwise providing the EM hybrid game with funds. After receiving (302) RWC and while (303) the EM game portion of the EM hybrid game is being played by the player, the game play of the EM game is monitored (304). A decision (306) is then made that determines if a gameplay gambling event associated with a gambling game has occurred. A gameplay gambling event is any event in the entertainment game from which a gambling game can be triggered. If a gameplay gambling event has not occurred, the process continues to monitor (304) play of the EM game. Occurrence of a gameplay gambling event causes RWC to be wagered (308) in the gambling game. The outcome of the wager in the gambling game is used to affect (310) the gameplay of the EM game using one or more actuators of the EM game. In certain embodiments, one or more actuators are operated so as to increase a game difficulty level upon a loss outcome of the gambling game, or one or more actuators are operated so as to decrease a game difficulty level upon a win outcome of the gambling game.

Although various methods of operating EM hybrid games are discussed above, EM hybrid games can be operated in any manner as appropriate to the requirements of a specific application in accordance with embodiments of the invention. Operation of an EM hybrid game that utilizes a pop shot EM game is discussed further below.

Pop Shot Electromechanical Game

An EM hybrid game in accordance with many embodiments can implement a pop shot type of EM game within the EGS of the EM hybrid game. In certain embodiments, a pop shot game is similar to an arcade game whereby a player has a fixed amount of time to shoot baskets at a stationary or moving basketball hoop. Inserting RWC into the EM game gives the player access to basketballs so long as there is time remaining. During the fixed time interval the player shoots continuously at the basket. Each time a basket is made, the player gains GWC, and a gambling game is initiated that wagers a specified amount of RWC. If the gambling game results in a gain of RWC, the player gains additional time on the clock to play the game. The player continues shooting until there is no time remaining, even if they have run out of RWC. In certain embodiments, when RWC reaches zero no more gambling games will be initiated.

In several embodiments, pop shot EM hybrid game play is not metered by time but rather by a fixed number of shots available to the player (such as but not limited to one for each RWC inserted into the EM hybrid game). Each time the player takes a shot, a RWC is consumed in the gambling game. If the player receives a payout in the gambling game, RWC accumulates, and additional basketballs are made available to the player. If the player loses the gambling game, RWC decreases, and additional basketballs are not released to the player. GWC is accumulated as a function of the number of basketball shots made, and can be used to drive a bonusing system, whereby additional basketballs are made available, along with associated free gambling game play for shots made with these extra basketballs when a high enough level of GWC is achieved.

In particular embodiments, a player can choose to have the basketball hoop remain stationary or to move. A different gambling game would be associated with play in each circumstance, and differing amounts of GWC would be earned for baskets made in each context.

In certain embodiments, basketballs of different colors, weights or sizes can be used to correlate to varying amounts of RWC. The amount of GWC earned as a function of each basket made could also vary with the size of the basketball.

Although various configurations of a pop shot EM game part of an EM hybrid game are discussed above, EM hybrid games can be configured to operate in any manner as appropriate to the requirements of a specific application in accordance with embodiments of the invention. Operation of an EM hybrid game that utilizes a foosball EM game is discussed further below.

Foosball Electromechanical Game

An EM hybrid game in accordance with many embodiments can implement a foosball type of EM game within the EGS of the EM hybrid game. In certain embodiments, a foosball type EM game is similar to a version of the table soccer game whereby between two and four players (either one or two players per team) attempt to score goals on the opposing team by shooting a small ball into a net at either end of the table. Inserting RWC into the EM hybrid game gives players access to a fixed number of balls (each corresponding to a specific amount of RWC) that can be put into play on the table. RWC can be managed collectively by the system (such as but not limited to RWC submitted on behalf of all players and treated as a single pool) or independently for each team. During the game, a single ball is dropped into the table, and the players direct the ball, via their rod-mounted soccer players, towards the opponent's goal. A gameplay gambling event can occur each time a goal is scored where the scoring team gains GWC, and a gambling game is initiated for a specified amount of RWC. If the gambling game results in a gain of RWC, the team that scored the goal is awarded RWC and an additional ball or balls (corresponding to the amount of RWC won) for subsequent deployment in the foosball type EM game.

In several embodiments, RWC is treated as a single pool where the scoring of a goal still causes an allocation of GWC to the scoring team, but makes an additional soccer ball available for use by either team, thereby extending play of the EM game. EM game play can also cause RWC to accrue to the pool (if the gambling game returns a winning result), said RWC being capable of being cashed out at any time.

In numerous embodiments, the introduction of the ball into the game triggers the gambling game, the consumption of RWC and the possible awarding of RWC and GWC as well as additional game balls.

In a number of embodiments, the nature of the gambling game (such as but not limited to the pay tables or odds) is affected by the nature of the goal scored. A goal scored via a shot by a defensive player at the far end of the table may convey, for example, better odds in the gambling game, than a goal scored using the offensive players closest to the opponent's goal. In several embodiments, a fraud detection system can be utilized to sense a lack of effort to defend against a goal in order to increase the odds of the gambling game. In a number of embodiments, the fraud detection system suspends the operation of the hybrid game. In many embodiments, the fraud detection system simply notifies the users that they are not eligible for increased odds prior to conducting the gambling game.

In particular embodiments, when players put RWC into the EM hybrid game, a fixed number of different balls (such as but not limited to different colors, sizes or numbers) are provided to the players. Each type of ball conveys a specific amount of RWC to be bet, with the total corresponding to the amount of RWC entered into the EM hybrid game. In certain embodiments, when 10 RWC is bet, and five balls are provided, three of these balls might be yellow, corresponding to a single credit of RWC, one might be blue corresponding to two RWCs and another ball might be red corresponding to five RWCs. By choosing which ball to play, the player(s) dictate the size of the gambling wager to be made.

In certain embodiments, upon entering RWC into the EM hybrid game, players can allocate, through a user interface, the distribution of RWC across the soccer balls provided.

In several embodiments, the amount of RWC associated with a given soccer ball is fixed, but the number of balls provided to the player varies as a function of the amount of RWC entered into the EM hybrid game.

In a number of embodiments, both the number of balls, and the amount of RWC associated with each ball or consumed upon a goal being scored can be set by the player prior to commencing play of the foosball type EM game.

Although various configurations of a foosball type EM game part of an EM hybrid game are discussed above, EM hybrid games can be configured to operate in any manner as appropriate to the requirements of a specific application in accordance with embodiments of the invention. Operation of an EM hybrid game in tournament play is discussed further below.

Tournament Play

EM hybrid games in accordance with many embodiments enables players to engage in tournament play with other players in an entertainment game for accumulation of GWC while engaging in a gambling game. Tournament play can be player vs. machine in a single-player mode or multi-player mode, and can also be player v. machine and/or other player(s) as a function of a specific EM game. Tournaments can involve simultaneous play by two or more players or asynchronous play by one or many players depending upon the nature of the EM game. Tournaments can be formally scheduled events or ad hoc events triggered by attainment of a specific amount of GWC.

In several embodiments, a tournament may or may not necessitate payment of an entry fee, payment of GWC, and may or may not pay out cash or other prizes to the winner(s). A wide range of variations to the tournament format can be added, including the use of a loser's bracket that might necessitate the payment of an additional entry fee to continue. Tournament caps or minimums relating to player prowess can also be established to ensure relatively balanced competition.

In several embodiments, tournament play can involve players competing head-to-head simultaneously across a number of networked EM hybrid games or it can involve players competing on independent EM hybrid games either serially or simultaneously and their scores being compared manually or automatically at the close of the tournament. Players can be exposed to their competitor's profiles during the tournament process, such that the "identity" of their competitors is known in the form of a player name, avatar or other defining characteristic(s).

In numerous embodiments, tournament play can take place across a network of a plurality of EM hybrid games, with a centralized tournament server connected to individual EM games while tracking entertainment game performance across the EM hybrid games. Alternately, a tournament can take place in the context of a plurality of EM hybrid games operating in more of a terminal mode under central control by a tournament server. In certain embodiments, the tournament server functionality is subsumed within a RWE server, GW patron management server, GWE server or a EGS server. Thereby an EM hybrid game tournament can be played in parallel or serially. In certain embodiments, EM hybrid games can include tournaments across one or a plurality of EM hybrid games that are not networked together, using various media to store individual player's results, which are then submitted for manual compilation and establishment of the tournament winner(s).

In several embodiments, tournaments can be set up on a scheduled or ad-hoc basis by a tournament organizer. In other embodiments, tournaments are staged directly by the players. In embodiments where players stage tournaments, the players can define the size of the tournament, time and place, rules, entry cost (in terms of GWC), and prizes (again in terms of GWC) using guidelines controlled by the a tournament organizer, or in a more ad hoc fashion.

Although various configurations for tournament play operation of an EM hybrid game are discussed above, EM hybrid games can be configured to operate in any manner as appropriate to the requirements of a specific application in accordance with embodiments of the invention. Internet based EM hybrid game operation is discussed further below.

Internet Based EM Hybrid Game Operation

EM hybrid games in accordance with many embodiments can include execution of functions associated with the RWE, GWE or EGS at remote locations over a network such as the Internet. Thereby, players can physically interact with EM games at casinos or other regulated locales, but the execution of the RWE, GWE and/or EGS might be run on one or more remote servers, connected securely to the local EM game via the internet or other network. Thereby, the only notable difference between a land based casino and a network (such as the Internet) based EM hybrid game would be whether players are present in a gambling operation location in the case of a land based operation, or at home or other distributed location in the case of the network or Internet based operation.

Although various configurations of Internet based EM hybrid game operation of an EM hybrid game are discussed above, EM hybrid games can be configured to operate in any manner as appropriate to the requirements of a specific application in accordance with embodiments of the invention. Management of player accounts in an EM hybrid game is discussed below.

Management of Player Accounts

EM hybrid games in accordance with many embodiments of the invention can manage the experience of particular players through player accounts for individual or groups of players. In many embodiments, player accounts can be centrally managed by the GWE of an EM hybrid game and can be property-specific, property group specific, title specific (spanning one or multiple properties—including Internet-based casinos or game play sites) or game-manufacturer specific. Player account management can also be linked to a frequent player card or other casino-related identification scheme. In numerous embodiments, player accounts are managed by a GW patron management server or other remote server.

In several embodiments, each player account can store one or more profiles, where each profile keeps track of a player's game identity (i.e. a player name), and attributes associated with the player account. For example, this might include (but is not limited to) the amount of GWC a player account has, the current state-of-play for that account (e.g. game level reached) or player preferences. Typically, RWC are not broken down to the player account level, but may be stored as part of the overarching player account. Also, a profile will typically be game-type specific, such that a given player account will contain one or more profiles per game-type played.

In various embodiments, each player account can include a profile and identifying details can be associated with the profile include (but not limited to) a name, a graphical representation of the profile (i.e. an avatar selected by or generated by the player), or other information linking the profile to the player (e.g. a photo of the player) to the player account.

In several embodiments, a player account enables players to interact with one another, either at the player account or player profile level. In certain embodiments, bulletin boards are supported for the posting of messages, and can span one or more casino properties, game types and/or on-line environments.

In many embodiments, player profiles support a reservation system whereby players can reserve an EM hybrid game machine at a casino for game-play at a specific date and time. This can be done graphically or via text, and can allow one or more EM hybrid game machines to be reserved such that individuals or groups can reserve specific physical locations to play. These reservations may or may not be accompanied by a deposit that may or may not be refunded when the reservation is filled or other fee structure such as a minimum spending commitment to book an EM hybrid game. The reservations can also be designed to support the concept of group play, such that individuals or groups can set up ad hoc tournaments involving head-to-head competition or score-based competitions depending upon the nature of the underlying EM game of the EGS in question.

In many embodiments, reservations can be made in the context of a player account and/or a player profile and/or be linked to an individual through a player card or other ID mechanism used within a casino environment. As part of the reservation system, a casino, or other managerial entity, can schedule specific games and invite players, as a function of player accounts and/or profiles, to participate. A scheduling function within the reservation system keeps track of all reservations within its span of control and can lock out specific EM hybrid game machines from general use by walk-up players as reserved use period approaches. Only the player with the appropriate reservation can sign in to the EM hybrid game machine and use it during the period in question. A mechanism for "kicking out" a player from a EM hybrid game machine can also be utilized, such that a player that stays at a EM hybrid game machine beyond the reserved period can be excluded from ongoing play. The reservation system can also be configured to prevent "kick out" and to instead shift a reservation from an occupied EM hybrid game machine to a different, open EM hybrid game machine, and to inform the player of this change via one of the below mentioned communication methods when appropriate contact information is associated with the player account in question.

In several embodiments, the reservation system can monitor reservation requests to maintain fairness of EM hybrid game play, such as (but not limited to) ensuring that players that are going to compete against one another in an asynchronous or head-to-head competition/tournament are not seated directly adjacent to one another to preclude collusion between players outside of the game environment.

In numerous embodiments, the reservation system also allows players to invite specific players (via their profiles) or unnamed players (i.e. an open invitation or "challenge") to compete against one another at a specified date or time, or within a specified period of time if the game is played asynchronously. Such challenges can be accompanied by wagers between the players, where the wager can include a payout of GWC or RWC. The system can accept invitations to such a "challenge game", monitor performance of the players to the challenge, and collect and distribute GWC or RWC as necessary in accord with the result of the game. The system can support both ad hoc challenges, where the challenger establishes the nature of the challenge, and pre-defined challenges, where a specific goal or scoring attribute is selected by the challenger from a pre-defined menu.

In many embodiments, the player profile and account management system also contains a GWC marketplace, whereby players can expend GWC to acquire a range of in-game attributes, possessions or characteristics for use in the casino deployed EGS game and/or in versions of the game that are used at home. In certain embodiments, a player might expend GWC to buy extra time for use by his player profile in the casino version of pop shot basketball that allows additional opportunities to sink baskets relative to the base game. In addition, a player can expend GWC to purchase a range of casino promoted prizes or benefits for use outside the game environment, including (but not limited to) discounts at casino shops, meal discounts, and free game play.

In a number of embodiments, the player profile and account management system, in addition to the aforementioned bulletin board method described previously, may enable players (via a specific account or at the player level) to communicate with other players, via their player profiles and/or at the player level, and also allows the casino (or manager of the gaming environment) to communicate with players outside of the gaming environment. The system can push communications to players through email and/or SMS messages, html, mobile phone apps, and/or text messages, voice mail messages or other communications means that a player has attached to his account. This allows players to received notices, such as (but not limited to) specific opportunities for game-play, new high scores, challenges made, declined or accepted, and the status of reservations. The system can also receive inputs to allow players to manage their account, such as (but not limited to) setting up reservations or to make, decline or accept challenges.

Although various configurations for player account management of an EM hybrid game are discussed above, EM hybrid games can be configured to operate in any manner as appropriate to the requirements of a specific application in accordance with embodiments of the invention. Leader boards and signage for EM hybrid games are discussed below.

Leader Boards and Signage

EM hybrid games in accordance with many embodiments of the invention can track entertainment game GWC scores to improve hybrid game play. In many embodiments, an EM hybrid game can issue additional GWC to the current high scoring player, on a time-metered basis, so long as that player remains the top scorer across the game or games in question. Similarly, players of the entertainment game can also receive additional benefits due to their accumulation of GWC such as a bonus of GWC upon reaching a certain level. Furthermore, a leader board can be posted to each EM hybrid game machine through the GWE and GWE Server, and/or can be displayed as part of the signage associated with one or more EM hybrid game machines inside the casino. A player profile and/or avatar's persistence on the leader board, and therefore their accumulation of GWC on a time-metered basis, continues according to parameters set by the casino operator. In certain embodiments, a player will remain on the leader board or over game signage until they would be removed if he or she does not play again within a fixed period of time (such as but not limited to 2 days or 30 days), or if the player rejects more than one invitation from another player for head-to-head competition over a 24 hour period.

In many embodiments, an EM hybrid game can be managed by adjusting a leader board, such as (but not limited to) the rate at which GWC is accumulated by players on the leader board, the period over which GWC can be so accumulated, and the number of EM hybrid game machines across which the leader board applies. EM hybrid game can be managed, such as by casino operators, to increase the rate of GWC accumulation for the leader board related to a bank of EM hybrid game machines getting low levels of play to induce more players to use these EM hybrid game machines. A bank of EM hybrid game machines experiencing very heavy game play might feature a lower rate of GWC accumulation by the players on its leader board or a shorter period before the accumulation is terminated without additional game play.

Although various configurations for implementing a leader board or other signage of an EM hybrid game are discussed above, EM hybrid games can be configured to operate in any manner as appropriate to the requirements of a specific application in accordance with embodiments of the invention. Secondary drawings for EM hybrid games are discussed below.

Secondary Drawing

EM hybrid games in accordance with many embodiments of the invention can implement a secondary drawing, which is a random drawing that awards GWC and/or RWC and/or other prizes to participating players. Based on selections made by a casino operator, or other manager of the EM hybrid game, players participate automatically and in a real time or non-real time fashion as a function of achieving some pre-specified goal of their play on the EGS. These goals can include (but are not limited to): (a) a specific level of GWC on a specific player profile is achieved, (b) accumulating a specific amount of GWC across all the player profiles within their player account, (c) accomplishing some feat in the game (e.g. getting ten basketballs in the hoop in a row), (d) gaining GWC at a rate greater than a specified threshold. Secondary drawings can award any form of prize, including (but not limited to), RWC, GWC, cash, merchandise, and EGS assets for use within the gambling environment including tournament play (such as but not limited to game balls that convey special gambling benefits). Secondary drawing may or may not require the player to purchase entry into the drawing by expending GWC, as the secondary drawing can also be free. The drawings may take place for each player immediately upon crossing a GWC threshold or paying the GWC entry fee, or may operate by issuing the player a real or virtual "ticket" representing a single entry into the drawing, said drawing taking place at a specific date and time. The secondary drawing may be solely for that player in that they have a certain chance of being drawn and thus being awarded the prizes, or they may be entered into a pool of entrants with one or more entrants being drawn and awarded a prize.

Although various configurations for a secondary drawing of an EM hybrid game are discussed above, EM hybrid games can be configured to operate in any manner as appropriate to the requirements of a specific application in accordance with embodiments of the invention. User interface management for EM hybrid games are discussed below.

User Interface Management

EM hybrid games in accordance with many embodiments of the invention can include a user interface that enables a player to be appraised as to the current status of the player's play of the EM hybrid game. A user interface can include display and input devices that can be resident within a single physical device (i.e. portions of a flat panel display) or can consist of a multitude of displays and input devices for each major subsystem's conceptual display (RWE, GWE and EGS).

In many embodiments, the EGS game status and score appears in a window (created through software) on a physical display, said window being framed by a window (again software generated) consisting of information about the gambling game. Both are manifest within the same physical display. The RWE display, which frames the GWE display window (in which the EGS game status and score appears), would provide any and all information relevant to the RWE game, including (but not limited to), number of credits, magnitude of current bet, winnings this session, results of previous RWE game play, odds of winning, active bonuses or multipliers. The boundaries between the GWE game display window and the framing RWE game display need not be static. In certain embodiments, a RWE game display window could impinge upon the GWE game display window, in a dynamic mode form, to alert the player to a change in the status of their RWE gambling game such as a winning event, losing event, jackpot round entry or other notable occurrence. A non-exhaustive list of examples of this dynamic impingement could be a starburst flash, an expanding bubble, a rapid zoom in, or a shaking screen. The GWE game display window would typically not impinge upon the RWE game display if such impingement would serve to obscure the player's information related to the RWE game, such as but not limited to the number of credits the player has in the EM hybrid game machine. In certain embodiments, the physical shape of the RWE game display need not be a full frame enclosing the GWE game display window. It can consist of any portion thereof, such as a single side bar, and need not be rectilinear in shape.

In numerous embodiments, an entertainment game user interface is accessed by the GWE to interact with the player as relates GWE related functions (such as but not limited to communications with other players, announcements and notices regarding tournaments and/or promotional offers, and secondary drawings). However, these aspects of the entertainment game user interface need not always be present. They can be hidden or displayed as governed by rules resident within the GWE, where the rules can take into account the requirements of the EGS and RWE games and their display so as to not interfere with game play.

In several embodiments, additional physical devices can be used to communicate with the player as related to entertainment game or gambling game play, such as but not limited to where the user interface can span multiple devices. In terms of communicating information to the player, these additional devices can take the form of conventional visual displays normally associated with computers and/or visual communication, such as but not limited to flat panel displays, or they can be electromechanical devices. In certain embodiments, gambling game information could be conveyed to the player in whole or in part through LED numerical displays, or an electromechanical construct (such as but not limited to an electromechanical needle meter that could be used to indicate RW credits, while an analog clock could indicate a player's status in the EGS game, and a transparent tube of balls could be emptied on the bottom and filled on the top to visually communicate overall credit status). In a number of embodiments, user interfaces can be connected directly to the GWE and/or the EGS as opposed to being ported through the GWE to the EGS.

In numerous embodiments, entertainment game and gambling game user interfaces can include a plurality of physical devices. The entertainment game user interface or the gambling game user interface could include multiple displays, or a single display plus one or more electromechanical devices (such as but not limited to a vibratory shaker, audio speakers, or flashing lights).

Although various configurations for user interface management of an EM hybrid game are discussed above, EM hybrid games can be configured to operate in any manner as appropriate to the requirements of a specific application in accordance with embodiments of the invention. Modes of use for EM hybrid games are discussed below.

Modes of Use

EM hybrid games in accordance with many embodiments of the invention can operate in various modes of operation. These modes can include (but are not limited to) a combined skill and random mode, random only mode and skill only mode.

In many embodiments, a random only mode allows the entire game to be switched to operate as a gambling game, such as but not limited to as a conventional slot-machine. This mode does not include any game of skill and more conventional entertainment graphics such as spinning wheels of fruit or other objects within pay lines are displayed in response to a manual play trigger (such as but not limited to spin reels button) to provide a traditional gambling game experience. A gambling game may be displayed on one or more of the game's user interfaces.

In several embodiments, a skill only mode allows for the entire game to be switched to operate as an entertainment game only. In certain embodiments, an EM hybrid game running in this mode can operate as a conventional video arcade game. The RWE system is dormant so that there is no randomness except as is provided by the EGS and its attendant EM game, and the GWE and EGS operate in concert to provide a non-gambling gaming experience to the player. An EM game that runs in a skill only mode may charge money for game play in the mode of a conventional video arcade (such as but not limited to money purchases a fixed amount of game time, basketballs, or other metric). In this mode, the player cannot wager RWC but can wager GWC, such as wagering on the outcome of game play in betting against other players and/or the house as to the ultimate outcome of the game or other game related characteristic at the end of the game, such as whether a shut-out might result in a head-to-head match of foosball. Similarly, an EM hybrid game manager may still choose to operate tournaments and reward players with prizes based on the amount of accumulated GWC.

In numerous embodiments, a combined skill and random mode is a native mode that includes both an entertainment game and a gambling game. In this native mode, the RWE's role is to provide an operating system for a gambling game with player entertainment functions left to the GWE, EGS and EM game.

Although various configurations for modes of use of an EM hybrid game are discussed above, EM hybrid games can be configured to operate in any manner as appropriate to the requirements of a specific application in accordance with embodiments of the invention. Processing apparatuses for EM hybrid games are discussed below.

Processing Apparatus

Any of a variety of processing apparatuses can host various components of an EM hybrid game in accordance with embodiments of the invention. In several embodiments, these processing apparatuses can include, but are not limited to, a gaming machine, a general purpose computer, a computing device and/or a controller. A processing apparatus that is configured to implement an EM hybrid game in accordance with an embodiment of the invention is illustrated in FIG. 6. In the processing apparatus 400, a processor 404 is coupled to a memory 406 by a bus 428. The processor 404 is also coupled to non-transitory processor-readable storage media, such as a storage device 408 that stores processor-executable instructions 412 and data 410 through the system bus 428 to an I/O bus 426 through a storage controller 418. The processor 404 is also coupled to one or more interfaces that may be used to connect the processor to other processing apparatuses as well as networks as described herein. The processor 404 is also coupled via the bus to player input devices 414, such as tactile devices including but not limited to keyboards, keypads, foot pads, touch screens, and/or trackballs, as well as non-contact devices such as audio input devices, motion sensors and motion capture devices that the processing apparatus may use to receive inputs from a player when the player interacts with the processing apparatus. The processor 404 is connected to these player input devices 414 through the system bus 428, to the I/O bus 426 and through the input controller 420. The processor 404 is also coupled via the bus to player output devices 416 such as (but not limited to) visual output devices, audio output devices, and/or tactile output devices that the processing apparatus uses to generate outputs perceivable by the player when the player interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 428 to the I/O bus 426 and through the output controller 422. The processor 404 can also be connected to a communications interface 402 from the system bus 428 to the I/O bus 426 through a communications controller 424.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, and/or owners as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RWE, a GWE and an EGS as described herein can be implemented on multiple processing apparatuses, whether dedicated, shared or distributed in any combination thereof, or may be implemented on a single processing apparatus. In addition, while certain aspects and features of EM hybrid game processes described herein have been attributed to an RWE, a GWE or an EGS, these aspects and features may be implemented in a hybrid form where any of the features or aspects may be performed by any of a RWE, GWE or EGS within an EM hybrid game without deviating from the spirit of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. An electromechanical hybrid gaming system, comprising:

a real world engine configured to provide a randomly generated payout for a gambling game;

an electromechanical game system connected to an entertainment game user interface that senses an action by a player during skillful execution of an electromechanical table game, wherein the electromechanical game system is constructed to manage the electromechanical table game including an actuator that affects a goal of the electromechanical table game, wherein outcomes of the electromechanical table game are based upon actions performed by the player during skillful execution of the electromechanical table game when scoring using the goal, wherein the electromechanical game system operates the actuator based on an outcome of the randomly generated payout for the gambling game to increase a game difficulty level upon a loss outcome of the gambling game and to decrease a game difficulty level upon a win outcome of the gambling game; and a game world engine connected to the electromechanical game system and the real world engine, the game world engine constructed to communicate, to the real world engine, gameplay gambling event occurrences based upon the sensed actions by the player during the player's skillful execution of the electromechanical table game, wherein the gameplay gambling event occurrences communicated by the game world engine to the real world engine trigger the randomly generated payout for the gambling game.

2. The electromechanical hybrid gaming system of claim 1, wherein the outcomes of the electromechanical table game are based upon a consumption of at least one element used to further game play and the action by the player is a choice made that affects the consumption of at least one element.

3. The electromechanical hybrid gaming system of claim 1, wherein the actuator operates differently dependent upon a setting for an entertainment game difficulty level.

4. The electromechanical hybrid gaming system of claim 1, wherein operating the actuator based on an outcome of the randomly generated payout for the gambling game to increase a game difficulty level upon a loss outcome of the gambling game includes decreasing a size of the goal.

5. The electromechanical hybrid gaming system of claim 1, wherein operating the actuator based on an outcome of the randomly generated payout for the gambling game to decrease a game difficulty level upon a win outcome of the gambling game includes increasing a size of the goal.

6. The electromechanical hybrid gaming system of claim 1, wherein operating the actuator based on an outcome of the randomly generated payout for the gambling game to increase a game difficulty level upon a loss outcome of the gambling game and to decrease a game difficulty level upon a win outcome of the gambling game includes affecting electromechanical table game play via a rate at which the goal moves to alter a difficulty of scoring.

7. The electromechanical hybrid gaming system of claim 1, wherein the game world engine is configured to award game world credit based upon a player's skillful execution of the electromechanical table game.

8. The electromechanical hybrid gaming system of claim 1, wherein the electromechanical hybrid game is network connected to communicate with remote servers.

9. The electromechanical hybrid gaming system of claim 8, wherein the electromechanical hybrid game is network connected to communicate with a server selected from the group consisting of: a real world engine server, a game world patron management server, a game world engine server and an electromechanical game system server.

10. The electromechanical hybrid gaming system of claim 9, wherein the real world engine server is configured to provide a randomly generated payout for the gambling game.

11. An electromechanical hybrid gaming system, comprising:

an electromechanical game system connected to an entertainment game user interface that senses an action by a player during skillful execution of an electromechanical table game, wherein the electromechanical game system is constructed to manage the electromechanical table game including an actuator that affects a goal of the electromechanical table game, wherein outcomes of the electromechanical table game are based upon actions performed by the player during skillful execution of the electromechanical table game when scoring using the goal, wherein the electromechanical game system operates the actuator based on an outcome of a randomly generated payout for a gambling game to increase a game difficulty level upon a loss outcome of the gambling game and to decrease a game difficulty level upon a win outcome of the gambling game; and a game world engine connected to the electromechanical game system and a real world engine providing the randomly generated payout for the gambling game, wherein the game world engine is constructed to communicate, to the real world engine, gameplay gambling event occurrences based upon the sensed actions by the player during the player's skillful execution of the electromechanical table game, wherein the gameplay gambling event occurrences communicated by the game world engine to the real world engine trigger the randomly generated payout for the gambling game.

12. The electromechanical hybrid gaming system of claim 11, wherein the outcomes of the electromechanical table game are based upon a consumption of at least one element used to further game play and the action by the player is a choice made that affects the consumption of at least one element.

13. The electromechanical hybrid gaming system of claim 11, wherein the actuator operates differently dependent upon a setting for an entertainment game difficulty level.

14. The electromechanical hybrid gaming system of claim 11, wherein operating the actuator based on an outcome of the randomly generated payout for the gambling game to increase a game difficulty level upon a loss outcome of the gambling game includes decreasing a size of the goal.

15. The electromechanical hybrid gaming system of claim 11, wherein operating the actuator based on an outcome of the randomly generated payout for the gambling game to decrease a game difficulty level upon a win outcome of the gambling game includes increasing a size of the goal.

16. The electromechanical hybrid gaming system of claim 11, wherein operating the actuator based on an outcome of the randomly generated payout for the gambling game to increase a game difficulty level upon a loss outcome of the gambling game and to decrease a game difficulty level upon a win outcome of the gambling game includes affecting electromechanical table game play via a rate at which the goal moves to alter a difficulty of scoring.

17. The electromechanical hybrid gaming system of claim 11, wherein the game world engine is configured to award game world credit based upon a player's skillful execution of the electromechanical table game.

18. The electromechanical hybrid gaming system of claim 11, wherein the electromechanical hybrid game is network connected to communicate with remote servers.

19. The electromechanical hybrid gaming system of claim 18, wherein the electromechanical hybrid game is network connected to communicate with a server selected from the group consisting of: a real world engine server, a game world patron management server, a game world engine server and an electromechanical game system server.

20. The electromechanical hybrid gaming system of claim 19, wherein the real world engine server is configured to provide a randomly generated payout for the gambling game in communication with a hybrid game's real world engine.

21. An electromechanical hybrid gaming system, comprising:

a real world engine configured to provide a randomly generated payout for a gambling game; and a game world engine connected to an electromechanical game system and the real world engine, the electromechanical game system connected to an entertainment game user interface that senses an action by a player during skillful execution of an electromechanical table game, wherein the game world engine is constructed to:

manage the electromechanical game system, wherein the electromechanical game system operates an actuator that affects a goal of the electromechanical table game based on an outcome of the randomly generated payout for the gambling game to increase a game difficulty level upon a loss outcome of the gambling game and to decrease a game difficulty level upon a win outcome of the gambling game; and communicate, to the real world engine, gameplay gambling event occurrences based upon the sensed actions by the player during the player's skillful execution of the electromechanical table game, wherein the gameplay gambling event occurrences communicated by the game world engine to the real world engine trigger the randomly generated payout for the gambling game.

22. The electromechanical hybrid gaming system of claim 21, wherein the outcomes of the electromechanical table game are based upon a consumption of at least one element used to further game play and the action by the player is a choice made that affects the consumption of at least one element.

23. The electromechanical hybrid gaming system of claim 21, wherein the actuator operates differently dependent upon a setting for an entertainment game difficulty level.

24. The electromechanical hybrid gaming system of claim 21, wherein operating the actuator based on an outcome of the randomly generated payout for the gambling game to increase a game difficulty level upon a loss outcome of the gambling game includes decreasing a size of the goal.

25. The electromechanical hybrid gaming system of claim 21, wherein operating the actuator based on an outcome of the randomly generated payout for the gambling game to decrease a game difficulty level upon a win outcome of the gambling game includes increasing a size of the goal.

26. The electromechanical hybrid gaming system of claim 21, wherein operating the actuator based on an outcome of the randomly generated payout for the gambling game to increase a game difficulty level upon a loss outcome of the gambling game and to decrease a game difficulty level upon a win outcome of the gambling game includes affecting electromechanical table game play via a rate at which the goal moves to alter a difficulty of scoring.

27. The electromechanical hybrid gaming system of claim 21, wherein the game world engine is configured to award game world credit based upon a player's skillful execution of the electromechanical table game.

28. The electromechanical hybrid gaming system of claim 21, wherein the electromechanical hybrid game is network connected to communicate with remote servers.

29. The electromechanical hybrid gaming system of claim 28, wherein the electromechanical hybrid game is network connected to communicate with a server selected from the group consisting of: a real world engine server, a game world patron management server, a game world engine server and an electromechanical game system server.

30. The electromechanical hybrid gaming system of claim 29, wherein the real world engine server is configured to provide a randomly generated payout for the gambling game in communication with a hybrid game's real world engine.

* * * * *